United States Patent
Kanai et al.

(10) Patent No.: US 9,804,606 B2
(45) Date of Patent: Oct. 31, 2017

(54) MANAGEMENT CONTROL DEVICE

(71) Applicant: HITACHI CONSTRUCTION MACHINERY CO., LTD., Tokyo (JP)

(72) Inventors: Masaki Kanai, Tokyo (JP); Tomoyuki Hamada, Tsuchiura (JP); Manabu Katou, Tokyo (JP); Takuya Naka, Tokyo (JP); Masatsugu Arai, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/124,042

(22) PCT Filed: Mar. 3, 2015

(86) PCT No.: PCT/JP2015/056257
§ 371 (c)(1),
(2) Date: Sep. 7, 2016

(87) PCT Pub. No.: WO2016/051817
PCT Pub. Date: Apr. 7, 2016

(65) Prior Publication Data
US 2017/0017239 A1     Jan. 19, 2017

(30) Foreign Application Priority Data

Sep. 29, 2014  (JP) ................................ 2014-199471

(51) Int. Cl.
*G01C 22/00*     (2006.01)
*G05D 1/02*      (2006.01)
(Continued)

(52) U.S. Cl.
CPC .......... *G05D 1/0287* (2013.01); *A01B 39/00* (2013.01); *B60W 10/18* (2013.01); *B60W 10/20* (2013.01);
(Continued)

(58) Field of Classification Search
CPC .. G05D 1/0287; G05D 1/0055; G05D 1/0088; G05D 1/02; A01B 39/00;
(Continued)

(56) References Cited

U.S. PATENT DOCUMENTS 6,288,006 B1 *   9/2001   Arretz .................... B01J 37/20
                                                  502/216
6,480,769 B1 *  11/2002   Kageyama ............. G08G 1/207
                                                  701/23

(Continued)

FOREIGN PATENT DOCUMENTS

JP     2001-109519 A    4/2001
JP     2007-164280 A    6/2007

(Continued)

OTHER PUBLICATIONS

International Search Report of PCT/JP2015/056257 dated May 26, 2015.

*Primary Examiner* — Shardul Patel
(74) *Attorney, Agent, or Firm* — Mattingly & Malur, PC

(57) ABSTRACT

A management control device controls multiple unmanned vehicles, including the overtaking of a vehicle using an opposite lane. First and second travel permission sections are set for an own vehicle and another vehicle in a stopped state located ahead of the own vehicle on a traveling lane. A path by which the own vehicle overtakes the other vehicle is generated to include a first transition section to change lanes from a traveling lane to an opposite lane, an overtaking section that connects to the first transition section. Also included is a second transition section that connects to the front end of the overtaking section and is for the own vehicle to return to the traveling lane. The section length of the second travel permission section being set in advance is thereby shortened.

6 Claims, 15 Drawing Sheets

(51) Int. Cl.

| | | |
|---|---|---|
| *B60W 10/18* | (2012.01) | |
| *B60W 10/20* | (2006.01) | |
| *B60W 30/10* | (2006.01) | |
| *G05D 1/00* | (2006.01) | |
| *G08G 1/0965* | (2006.01) | |
| *G08G 1/0968* | (2006.01) | |
| *A01B 39/00* | (2006.01) | |
| *G08G 1/0969* | (2006.01) | |
| *G08G 1/16* | (2006.01) | |
| *G08G 1/00* | (2006.01) | |

(52) U.S. Cl.
CPC ........... *B60W 30/10* (2013.01); *G05D 1/0055* (2013.01); *G05D 1/0088* (2013.01); *G05D 1/02* (2013.01); *G08G 1/0965* (2013.01); *G08G 1/0969* (2013.01); *G08G 1/096805* (2013.01); *G08G 1/096816* (2013.01); *G08G 1/164* (2013.01); *G08G 1/166* (2013.01); *G08G 1/167* (2013.01); *G08G 1/207* (2013.01); *B60W 2720/14* (2013.01)

(58) Field of Classification Search
CPC ...... B60W 10/18; B60W 10/20; B60W 30/10; B60W 2720/14; G05G 1/0965; G08G 1/096805; G08G 1/096816; G08G 1/0969; G08G 1/164; G08G 1/166; G08G 1/167; G08G 1/207
USPC ................ 701/23–26, 50, 70, 400; 187/382; 370/328
See application file for complete search history.

(56) References Cited

U.S. PATENT DOCUMENTS

| | | | | |
|---|---|---|---|---|
| 6,543,983 | B1* | 4/2003 | Felder | ................. B23Q 7/1442 414/331.07 |
| 6,778,097 | B1* | 8/2004 | Kajita | ..................... E02F 3/437 340/12.5 |
| 2004/0040792 | A1* | 3/2004 | Uranaka | ................. E21F 13/00 187/382 |

FOREIGN PATENT DOCUMENTS

| | | |
|---|---|---|
| JP | 2008-026960 A | 2/2008 |
| WO | 98/37468 A1 | 8/1998 |

* cited by examiner

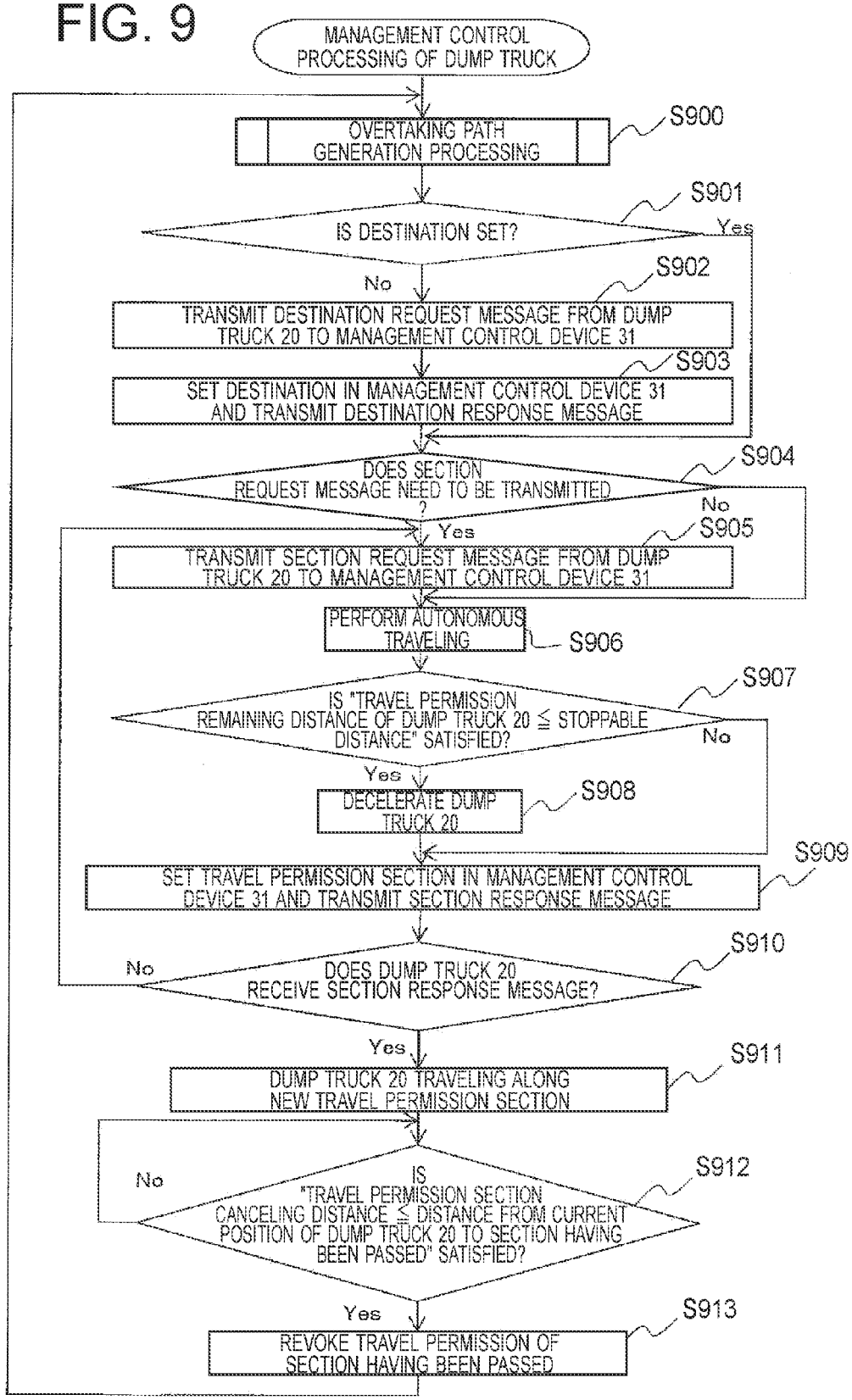

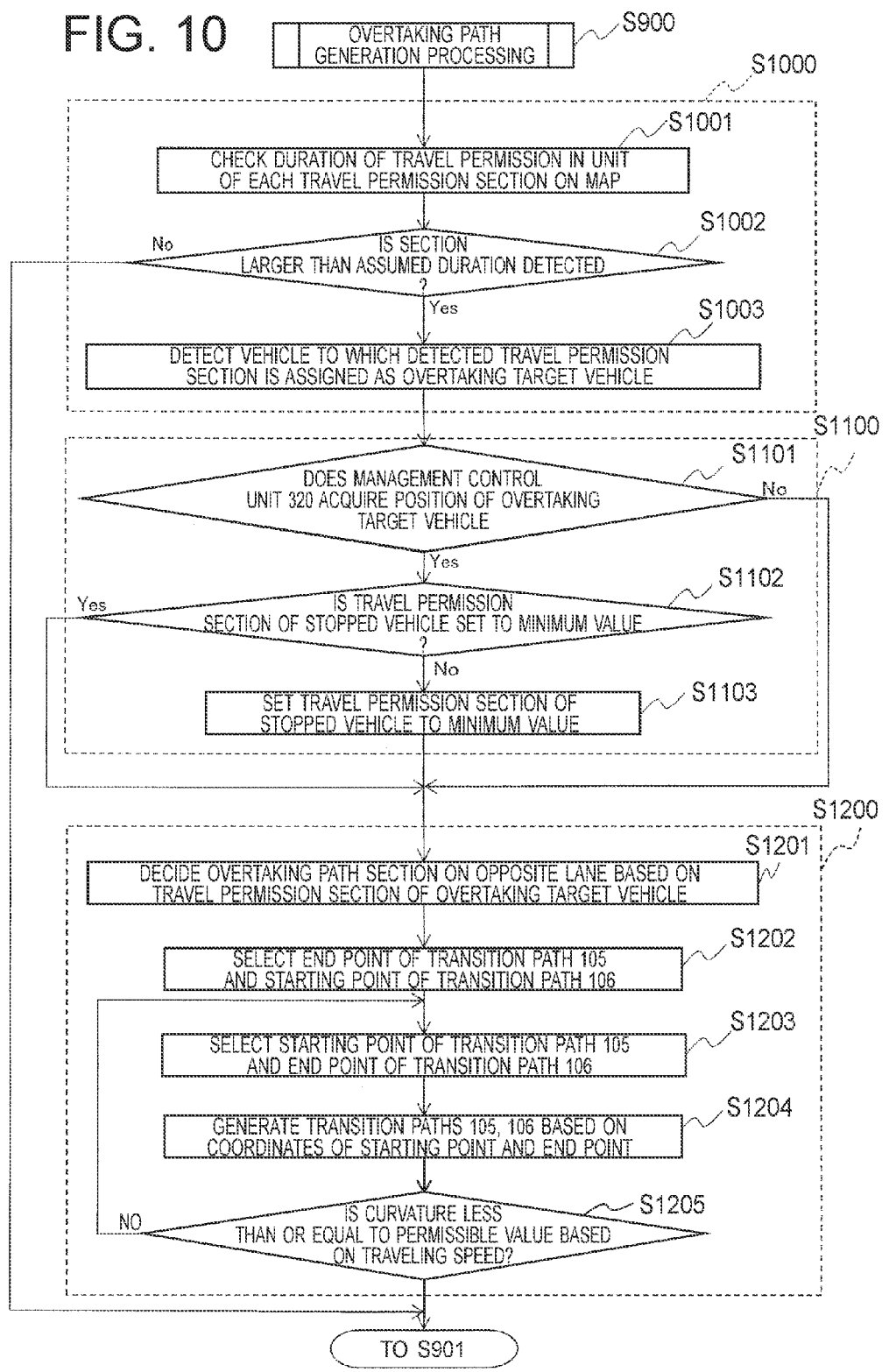

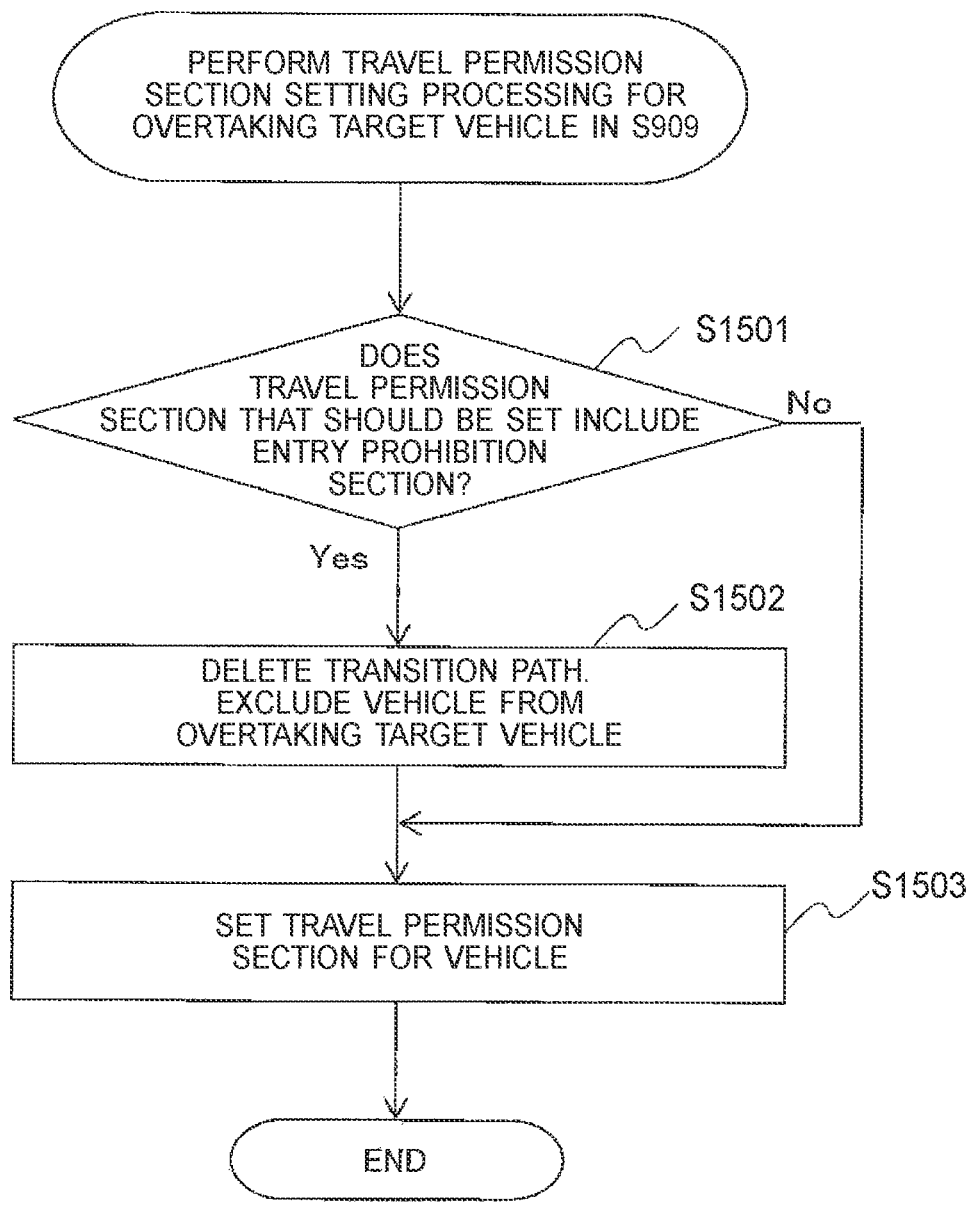

MANAGEMENT CONTROL DEVICE

TECHNICAL FIELD

The present invention relates to a management control device, and especially relates to a management control device for controlling multiple unmanned vehicles that perform autonomous traveling without an operator's steering operation in a work field so that the vehicles do not interfere with one another.

BACKGROUND ART

In the surface mining etc., there is known an autonomous travel system in which dump trucks (hereinafter referred to "unmanned dump trucks") that perform the autonomous traveling without driving by an operator are communication-connected to a management control device via a wireless communication channel and each of the unmanned dump trucks is managed and controlled.

Regarding the management control method, there are known a method whereby a spatial relationship between vehicles is grasped by performing communication with all vehicles frequently and instructions of deceleration, stop, etc. are transmitted, and a so-called block control method of preventing vehicles from collision by giving a travel permission section exclusively to each vehicle and controlling or managing the each vehicle to travel only in a section given to the each vehicle. Although with the former method, it is easy to perform more flexible control between the vehicles, it is necessary to communicate with all the vehicles with high frequency, and there is a demerit that a load on wireless communication is large. In contrast to this, although the latter block control method requires adjusting a spatial relationship between vehicles, a vehicle distance, etc. depending on how to give the travel permission section, since frequency of communication just requires existence of timing of updating the travel permission section, it has a merit that a load on the wireless communication is low.

Generally, a wireless communication system used in a mine has a feature that an allowed communication capacity is small in order to design it with enhanced reliability. Moreover, in the mine, complicated geographical features have influences, and communication disruption also occurs frequently. Therefore, it is desirable that communication frequency be as few as possible. Therefore, it is desirable to use the block control method for management control of the autonomous travel system in the mine.

Incidentally, in the surface mining, when multiple unmanned dump trucks are traveling, there may occur a situation where the unmanned dump truck traveling ahead of a subject vehicle stops due to a sudden failure and a necessity for the subject vehicle to overtake the forward stopped vehicle arises. As one example of this overtaking technology, Patent Document 1 discloses a configuration that specifies as follows: "Based on a monitoring result of a travel state of the travel path, an entry prohibition area is set ahead of one vehicle that travels one lane among two lanes for both directions, and a travel command that makes the vehicle travel in a part of a section of the opposite lane that opposes one lane while avoiding the entry prohibition area is given. To an oncoming vehicle traveling in the opposite lane, a travel command that prohibits entry into some sections is given. Moreover, an upper speed limit in a condition setting section of the travel path is set, and travel conditions including the upper speed limit that was set in association with the condition setting section are given to the vehicle as a travel command. When the travel command is given, the vehicle travels the travel path at a speed that does not exceed the upper speed limit."

CITATION LIST

Patent Literature

PATENT LITERATURE 1: U.S. Pat. No. 6,480,769

SUMMARY OF INVENTION

Technical Problem

In a configuration disclosed in the above-mentioned Patent Document 1, a distance of an overtaking path is decided by sum of an entry prohibition area and a distance over which a subject vehicle changes its lane. However, in order to perform overtaking with a shortest path like this, a position of the vehicle needs to be grasped frequently, which enlarges a load on wireless communication. Therefore, from a viewpoint of reducing the amount of the wireless communication, there is an actual situation that the overtaking technology of Patent Document 1 accompanied by an increase in the wireless communication cannot be applied to an autonomous travel system using block control.

Moreover, generally, when the overtaking is performed using the opposite lane, there is a case where the vehicle in the opposite lane is made to wait until the overtaking is finished, and the vehicle having waited will have a wider interval to its preceding vehicle. Since shovel's loading work time for one dump truck is decided to some extent, if a traveling time interval of the dump truck becomes longer than the shovel's loading time, a situation where the shovel must wait until the next dump truck arrives after the loading to the one dump truck is finished will occur. Since during that time, the shovel must suspend excavation work, mine production efficiency drops. Specially, there is a problem that the longer the time in which the overtaking vehicle passes the opposite lane, the more the influence becomes large.

The present invention is made in view of the above-mentioned problem, and its object is to provide a management control device for curtailing a load on the wireless communication and further reducing an influence affecting the traveling time interval of the vehicle in the opposite lane assuming the block control when performing the overtaking of a vehicle using the opposite lane.

Solution to Problem

In order to solve the above-mentioned problem, the management control device according to the present invention is a management control device that performs a management control for making multiple vehicles travel in a travel path in which the traveling lane and the opposite lane are positioned side by side and making the own vehicle that is one vehicle among the multiple vehicles overtake another vehicle stopped ahead on the traveling lane of the own vehicle via the opposite lane, having: a map information storage unit for storing traveling lane map information that defines a map of the traveling lane using multiple nodes positioned on the traveling lane and links connecting adjacent nodes and opposite lane map information that defines a map of the opposite lane using multiple nodes positioned on the opposite lane and links connecting adjacent nodes; a travel permission section management unit that sets a including at least one link as a first travel permission section where only the own vehicle is permitted to travel ahead of the own vehicle in the traveling lane for the own vehicle, and sets a including at least one link as a second travel permission section where only the other vehicle is permitted to travel ahead of the other vehicle in the traveling lane for the other vehicle; an overtaking path generation unit for generating an overtaking path that includes a first transition section for the own vehicle to change lanes from the traveling lane to the opposite lane at the overtaking, an overtaking section that connects to a node of a front end of the first transition path and is comprised of a link provided on the opposite lane, and a second transition section that connects to a node of a front end of the overtaking section and is for the own vehicle to return to the traveling lane from the overtaking section, and a communication control unit for receiving setting request information of the first travel permission section from the own vehicle and transmitting response information indicating the first travel permission section being set, in which, when the overtaking path generation unit generates the overtaking path, if the second travel permission section remains ahead of the other vehicle in the second travel permission section, the travel permission section management unit will shorten a section length of the remaining section, the overtaking path generation unit is such that the node of the front end of the first transition path is located at the same position or behind it as a node of a back end of the second travel permission section whose section length is shortened along a traveling direction with the position of the own vehicle as a reference and the node of the front end of the overtaking section is located at the same position or ahead of it as a node of a front end of the second travel permission section whose section length is shortened along the traveling direction with the position of the own vehicle as a reference; and the travel permission section management unit sets the first travel permission section on the overtaking path in case where, when the setting request information is received, setting of the travel permission section only on the traveling lane causes the own vehicle to interfere with the other vehicle.

Advantageous Effects of Invention

According to the present invention, it is possible to provide a management control device for curtailing the load on the wireless communication and further reducing an influence affecting the traveling time interval of the vehicle in the opposite lane when performing overtaking of a vehicle using the opposite lane assuming the block control. Problems, configurations, and effects other than those described above will be clarified by a description of the following embodiments.

BRIEF DESCRIPTION OF DRAWINGS

FIG. 9 is a flowchart showing a flow of management control processing.

FIG. 10 is a diagram showing details of overtaking path generation processing of FIG. 9.

FIG. 15 is a flowchart showing a flow of processing of a new travel permission section accompanied by deletion of the overtaking path.

DESCRIPTION OF EMBODIMENTS

In the following embodiments, when there is necessity for convenience, it is divided into multiple sections or embodiments and then they are explained. In the following embodiments, when mentioning the number of elements (including quantity, numerical value, amount, range, etc.) etc., they are not limited to the specific numbers and they may be more than and less than the specific numbers except for the case where they are explicitly indicated especially, the case where they are clearly limited to it theoretically, and the like. Incidentally, in the following embodiments, the constitutional element (including processing step) is not necessarily indispensable except for the case where it is explicitly indicated especially, the case where it is considered clearly indispensable theoretically, and the like.

Moreover, each configuration, function, processing unit, processing means, etc. in the following embodiments may be realized as hardware, for example, an integrated circuit and the like, with respect to a part or the whole thereof. Moreover, each configuration, function, processing unit, processing means, etc. that will be described later may be realized as programs executed on a computer. That is, they may be realized as software. Information of a program, a table, a file, etc. that realize the each configuration, function, processing unit, processing means, etc. can be stored in a storage device such as memory, a hard disk drive, and SSD (Solid State Drive) and storage media such as an IC card, an SD card, and a DVD.

Hereinafter, embodiments of the present invention are explained in detail based on drawings. Incidentally, in all diagrams for explaining the embodiments, the same or a related symbol is given to a member that has the same function, and its repeated explanation is omitted. Moreover, in the following embodiments, an explanation of the same or similar portion is not repeated in principle except a case where it is especially necessary.

Figure 1:
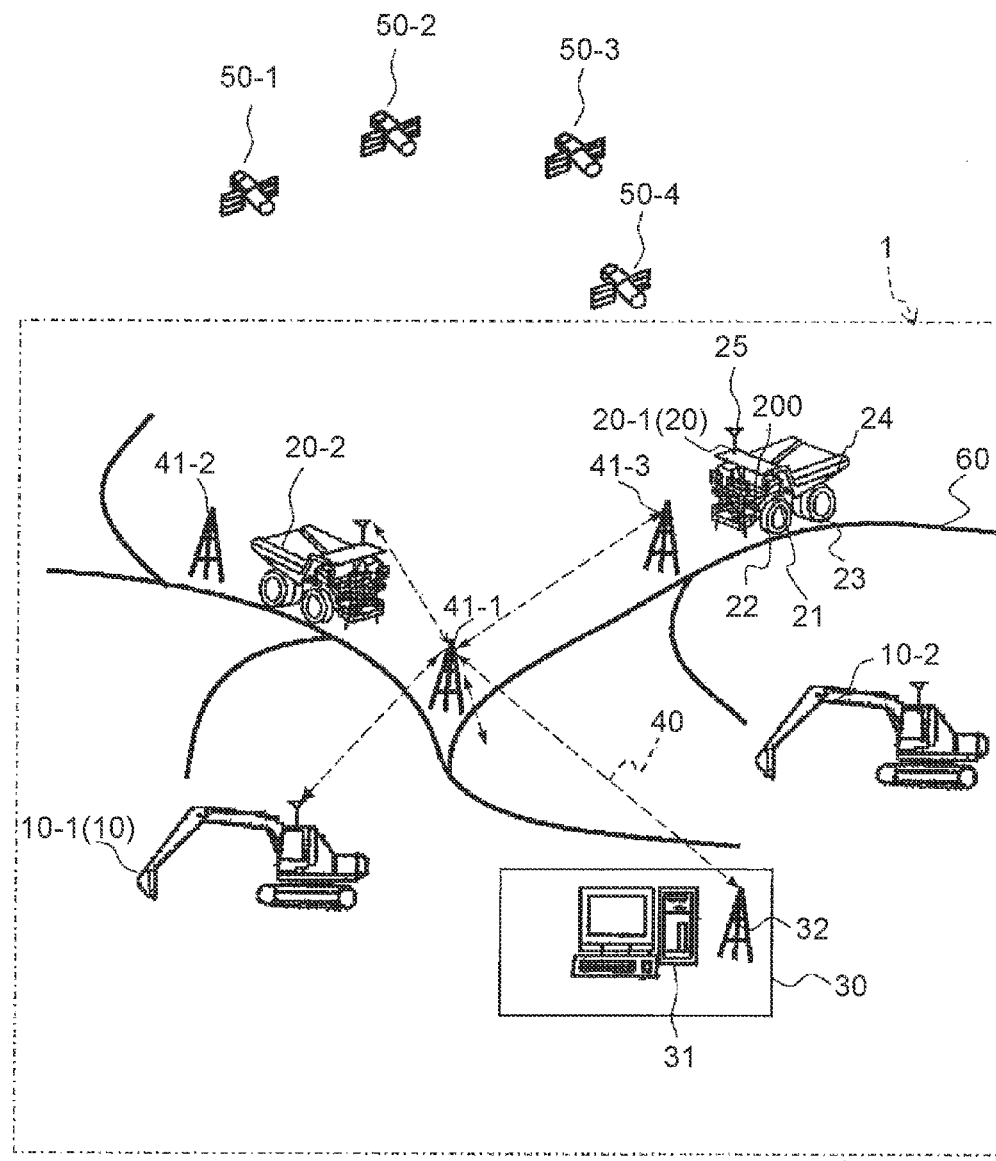
FIG. 1 is a diagram showing a schematic configuration of an autonomous travel system.

First, based on FIG. 1, a schematic configuration of an autonomous travel system including a control server according to the present invention is explained. FIG. 1 is a diagram showing the schematic configuration of the autonomous travel system.

An autonomous travel system 1 shown in FIG. 1 is configured with autonomous traveling conveyance vehicles 20-1, 20-2 for conveying loading of soils, ores, etc. that are loaded from shovels 10-1, 10-2 for performing excavation and loading works and a management control device 31 installed in the vicinity of a quarry or in a remote management center 30 that are communication-connected together through a wireless communication line 40. Since the dump trucks are used as autonomous traveling conveyance vehicles, the autonomous traveling conveyance vehicle is called the dump truck below. The management control device 31 is a management control device for transmitting control commands necessary for autonomous travel control of each of the dump trucks 20-1, 20-2. Moreover, when shovels are generically referred to without discriminating each of the shovels 10-1, 10-2, it is described as a shovel 10. Similarly, when dump trucks are generically referred to without discriminating each of the dump trucks 20-1, 20-2, it is described as a dump truck 20.

Each of the dump trucks 20-1, 20-2 goes back and forth between the shovel 10-1 or 10-2 and an unillustrated dumping site along a travel path 60 being set in advance in the mine, and conveys loading.

In the mine, multiple wireless communication base stations 41-1, 41-2, and 41-3 are installed. Then, an electric wave of wireless communication is transmitted and received via these wireless communication base stations 41-1, 41-2, and 41-3.

Each of the shovels 10-1, 10-2 and the dump trucks 20-1, 20-2 has a position computation device (illustration is omitted in FIG. 1) for acquiring a position of the own vehicle by receiving positioning electric waves from at least four navigation satellites 50-1, 50-2, 50-3, and 50-4 of the Global Navigation Satellite System (GNSS). As the GNSS, for example, GPS (Global Positioning System), GLONASS, and GALILEO may be used.

The dump truck 20 includes a frame 21 that forms its main body, front wheels 22 and rear wheels 23, a load body 24 rotatable in an up-and-down direction about a hinge pin (not illustrated) provided in a rear part of the frame 21 as a rotation center, and hoist cylinders (not illustrated) of one right-and-left pair for making this load body 24 rotate in the up-and-down direction. Moreover, an antenna 25 for connecting to the wireless communication line 40 is installed on a place of good visibility of the dump truck 20, for example, in front of an upper face of the dump truck 20.

Furthermore, the dump truck 20 mounts a travel control device 200 for performing autonomous traveling according to an instruction from the management control device 31.

The management control device 31 is connected to an antenna 32 for connecting with the wireless communication line 40. Then, the management control device 31 communicates with the dump truck 20 via the antenna 32 and the wireless communication base stations 41-1, 41-2, and 41-3. The management control device 31 according to this embodiment is characterized by performing a management control that makes multiple vehicles travel in a travel path in which the traveling lane and the opposite lane are positioned side by side and makes the own vehicle that is one vehicle among multiple vehicles overtake the other vehicle stopped ahead of the traveling lane of the own vehicle via the opposite lane.

Figure 2A:
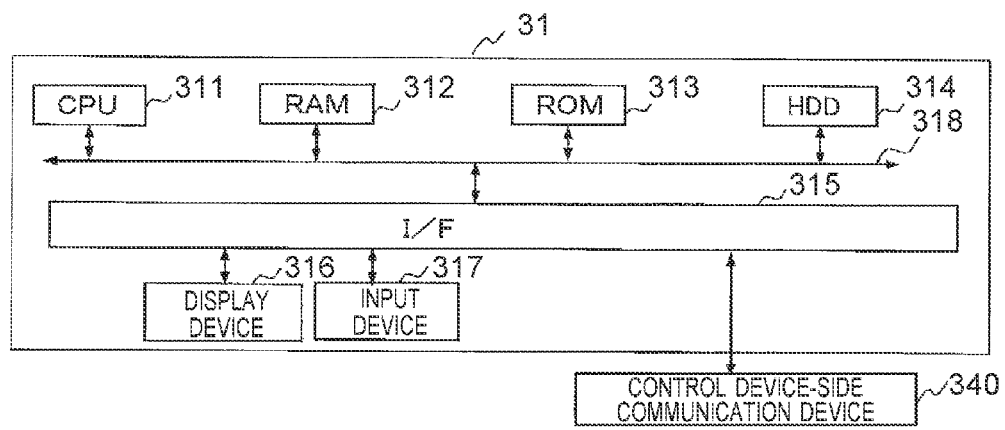
FIG. 2 is hardware configurations of a management control device and a dump truck, in which (a) shows a control server and (b) shows the dump truck.
Figure 2B:
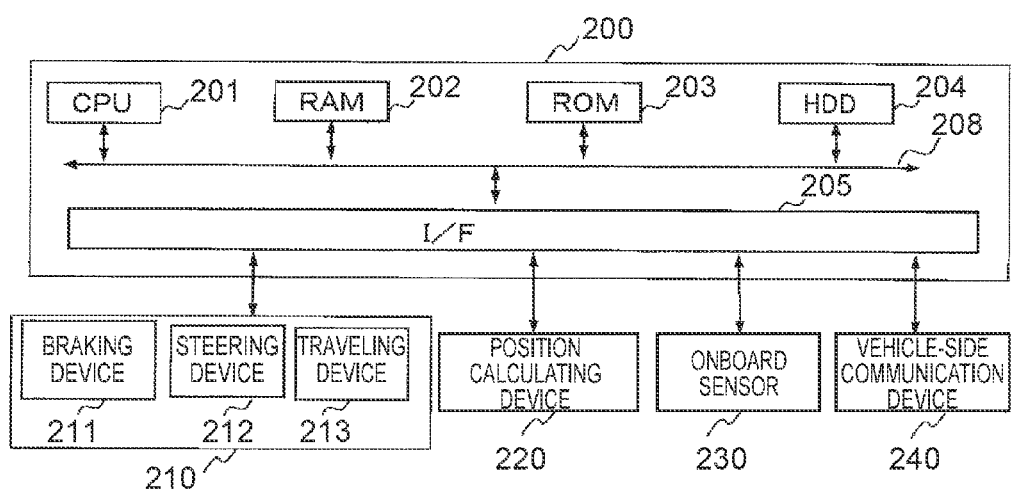
Figure 3:
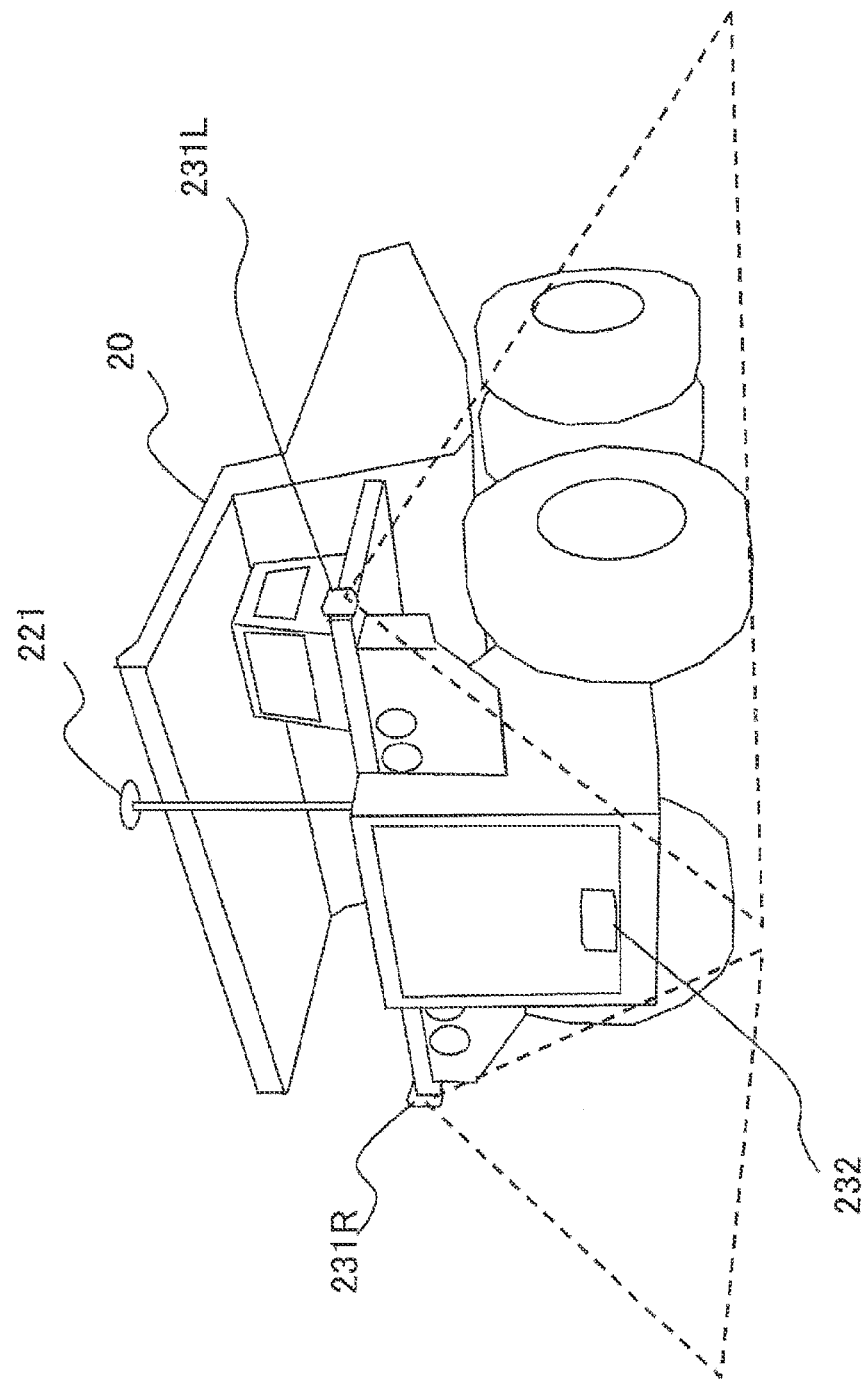
FIG. 3 is a diagram showing an appearance of the dump truck.

Next, with reference to FIG. 2 and FIG. 3, the management control device 31 and a hardware configuration of the dump truck 20 of FIG. 1 are explained. FIG. 2 is a configuration diagram of the management control device 31 and hardware of the dump truck 20, in which (a) shows a control server and (b) shows the dump truck. FIG. 3 is a diagram showing an appearance of the dump truck 20.

As shown in (a) of FIG. 2, the management control device 31 includes a CPU 311, RAM (Random Access Memory) 312, ROM (Read Only Memory) 313, an HDD (Hard Disk Drive) 314, an I/F 315, and a bus 318. Then, the management control device 31 is configured with the CPU 311, the RAM 312, the ROM 313, the HDD 314, and the I/F 315 connected through the bus 318.

Furthermore, the management control device 31 has a display device 316 and an input device 317, which are connected to the I/F 315. Moreover, a control device-side communication device 340 for connecting to the wireless communication line 40 is connected to the I/F 315.

The CPU 311 is an arithmetic logical unit, which controls operations of the entire management control device 31.

The RAM 312 is a volatile storage medium capable of high-speed reading and writing of information, which is used as a workspace when the CPU 311 processes information.

The ROM 313 is a read-only nonvolatile storage medium, in which an autonomous travel control program is stored.

The HDD 314 is a nonvolatile storage medium capable of reading and writing information, in which OS (Operating System), various kinds of control programs, application programs, etc. are stored.

The display device 316 is a user interface for a user to check visually a traveling state of the dump truck in the mine, and is configured with, for example, an LCD (Liquid Crystal Display).

The input device 317 is a user interface for the user to input information into the management control device 31, and is configured using, for example, a mouse, a keyboard, and a touch panel laminated on the LCD (illustration is omitted)

On the other hand, the dump truck 20 is such that the travel control device 200 includes a CPU 201, RAM 202, ROM 203, an HDD 204, an I/F 205, and a bus 208, as shown in (b) of FIG. 2. Then, the CPU 201, the RAM 202, the ROM 203, the HDD 204, and the I/F 205 are connected through the bus 208 to constitute the travel control device 200. Furthermore, a travel driving device 210, a position calculating device 220, an onboard sensor 230, and a vehicle-side communication device 240 are connected to the I/F 205.

The travel driving device 210 includes a breaking device 211 for braking the dump truck 20, a steering system 212 for changing a steering angle of the dump truck 20, and a traveling device 213 for making the dump truck 20 travel.

The position calculating device 220 is means for specifying a self position, and since in this embodiment, a GPS device that receives positioning electric waves from positioning satellites 50-1, 50-2, 50-3, and 50-4 and computes a position of the own vehicle is used, the dump truck 20 has a GPS antenna 221 (refer to FIG. 3). The position calculating device 220 does not need to be GPS, and may be based on, for example, an inertial measurement unit (IMU) or a system that pinpoints a position using an electric wave from a base station installed on the ground. In that case, the dump truck 20 has an antenna for the system, a gyro sensor, or a sensor for detecting a rotational speed of a wheel instead of the antenna 221 for GPS.

The onboard sensor 230 is for recognizing and estimating a speed of the dump truck 20 and surrounding environments, for example, corresponding to shoulder detection means and means for detecting an obstacle ahead. Although as the shoulder detection means, the present invention has laser radar sensors 231L, 231R (refer to FIG. 3), they may be means for detecting the shoulder by image processing using cameras, not being limited to them. In that case, the laser radar sensors 231L, 231R are replaced with cameras installed so that they may look down upon the vehicle body sideways. Moreover, although the embodiment has a millimeter wave radar sensor 232 as detection means of the obstacle ahead and detects the obstacle ahead in a traveling direction of the dump truck 20 using this output, it may have multiple cameras directed forward instead of the millimeter wave radar sensor 232. In this case, mounting positions of the multiple cameras are placed further upward than positions shown in FIG. 3 so that they may look down the front.

The detection result of the onboard sensor 230 is outputted to the travel control device 200, is used, at a normal time, for monitoring of a traveling position and acceleration/deceleration so that the vehicle may not deviate from the travel path, and is used, in an emergency, for a braking operation required for an emergency avoiding action.

In such a hardware configuration, by the autonomous travel control program stored in a recording medium, such as the ROM 203, 313, the HDDs 204, 314, or an unillustrated optical disk, being read into the RAM 202, 312 and by the program operating according to control of the CPUs 201, 311, the autonomous travel control program (software) realizes functions of the management control device 31 and the travel control device 200 working in cooperation with hardware. Incidentally, although in this embodiment, configurations of the management control device 31 and the travel control device 200 were explained by a combination of the software and the hardware, especially the dump truck 20 may be configured using an integrated circuit for realizing functions of the autonomous travel control program executed by the dump truck side.

Figure 4:
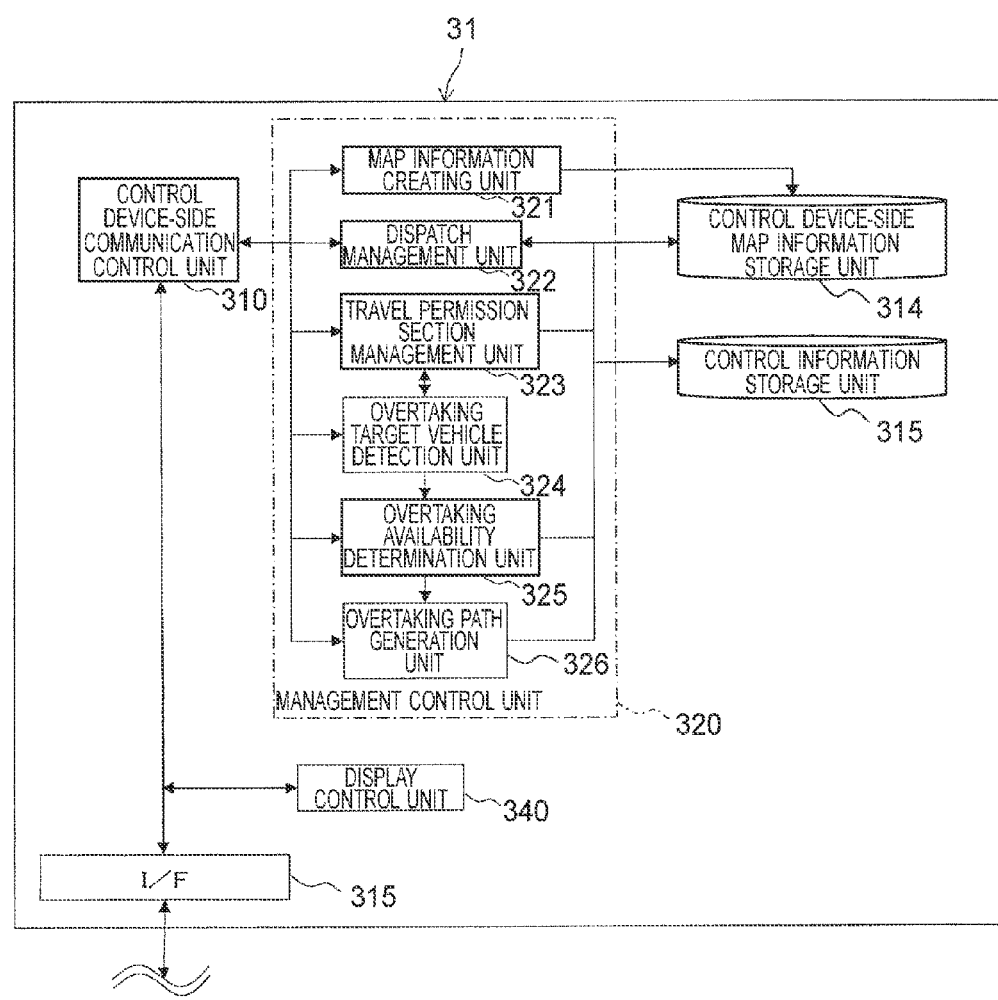
FIG. 4 is a functional block diagram showing main functions of the control server.
Figure 5:
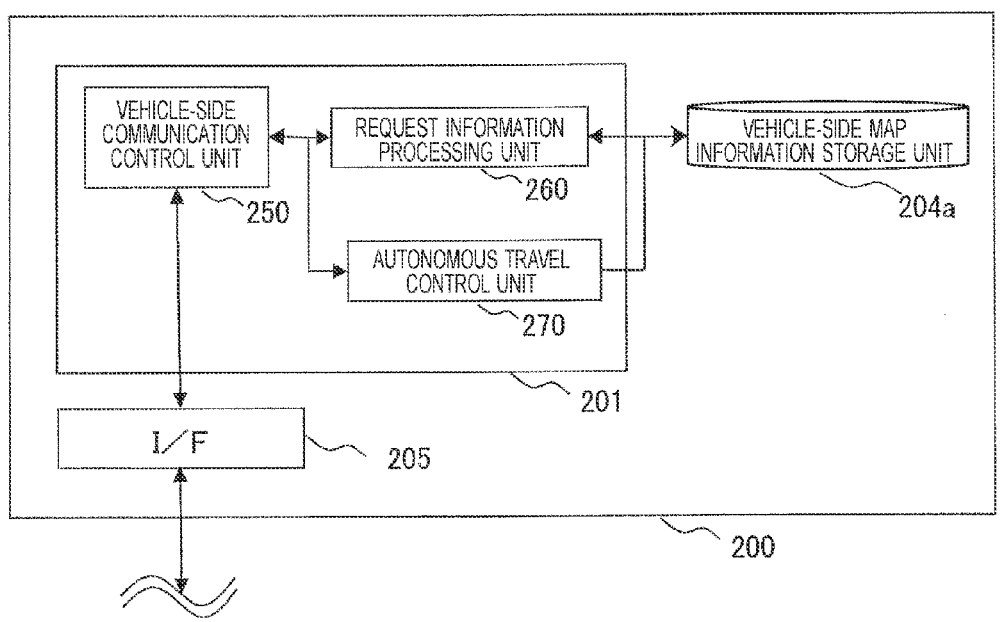
FIG. 5 is a functional block diagram showing main functions of a travel control device.

Next, with reference to FIG. 4 and FIG. 5, functional configurations of the management control device 31, the dump truck 20, and a manned vehicle 90 are explained. FIG. 4 is a functional block diagram showing main functions of the control server. FIG. 5 is a functional block diagram showing main functions of the travel control device 200.

As shown in FIG. 4, the management control device 31 includes a control device-side communication control unit 310 for performing a control for doing the wireless communication with the dump truck 20, a management control unit 320 for deciding a destination of the dump truck 20 and a travel path leading to it and for performing traffic control so that the dump trucks may not interfere with one another, a display control unit 340 for performing display control processing to the display device 316, a control device-side map information storage unit 314 for storing map information of the travel path in which the dump truck 20 travels, and a control information storage unit 315 for storing a travel permission section being set for each dump truck 20, a current traveling speed of the dump truck 20, a vehicle length thereof, etc.

The above-mentioned travel path 60 is configured including an outward path and a backward path, and an opposite lane is provided side by side to the traveling lane on which the own vehicle travels.

The control device-side communication control unit 310 is connected to the control device-side communication device 340 and performs the control for doing actual wireless communication with the dump truck 20.

The management control unit 320 includes a dispatch management unit 322, a travel permission section management unit 323, a map information generation unit 321, an overtaking target vehicle detection unit 324, an overtaking availability determination unit 325, and an overtaking path generation unit 326.

Prior to generation of the autonomous travel control, the map information generation unit 321 generates outward path map information (corresponding to the traveling lane map information) that is defined using nodes consisting of multiple positions on the outward path and links connecting adjacent nodes based on regulation information when a geometry track vehicle travels computing the travel positions of the outward path and the backward path of the travel path 60 with the position computation device mounted on the geometry track vehicle. Similarly, the map information of the backward path (corresponding to the opposite lane map information) is also generated. The length of the link included in these pieces of the map information has a unit length decided according to at least one of a vehicle length of the dump truck 20 and a speed limit being set to the link. For example, the unit length of the link may be set to n-times (n is a natural number) of the vehicle length of the dump truck 20. Alternatively, the unit length may be set to a longer length if the speed limit of the section of the travel path corresponding to each link is fast, and may be set to a shorter length if the speed limit is slow. The outward path map information and backward path map information are stored in the control device-side map information storage unit 314.

The dispatch management unit 322 sets the destination of the dump truck 20, and decides the travel path from the current position leading to the destination by referring to the map information stored in the control device-side map information storage unit 314. As an example of processing of the dispatch management unit 322, when the dump truck 20 is in a machinery parking site, for example, an entrance of a loading site including a loading position is set as an object. Then, the dispatch management unit 322 sets a travel path from the machinery parking site leading to an entrance of the loading site. Furthermore, when the dump truck 20 is at the loading position, the dispatch management unit 322 sets the dumping site as a destination, and generates a travel path leading to it. Moreover, the dispatch management unit 322 generates a travel path from the entrance of the loading site to the loading position dynamically accompanied with a shift of the loading position in the loading site, that is, generating the travel path each time the dump truck 20 travels from the destination of the loading site to the loading position. Moreover, the travel path from an entrance of the dumping site to a dumping position is also generated adaptively.

The travel permission section management unit 323 refers to the map information stored in the control device-side map information storage unit 314 for each dump truck 20, set a partial section on the travel path decided by the above as the travel permission section where the dump truck 20 is permitted to travel, and stores section information indicating a position of the travel permission section in the control information storage unit 315. The travel permission section management unit 323 decides a section length of the travel permission section based on the numbers of nodes and links included in the travel permission section.

The section information includes node identification information of a front boundary point that is a node at a foremost end of the travel permission section (hereinafter identification information is described as "ID") and a node ID of a back boundary point that is a node of a rearmost end.

Upon receipt of information (hereinafter referred to as a "section request message") that requests setting of a new travel permission section from each dump truck 20, the travel permission section management unit 323 performs setting processing of the travel permission section in response to this. When the new travel permission section is set, the travel permission section management unit 323 generates information (hereinafter referred to as a "section response message") showing the travel permission section, and when the setting could not be set, it generates a disapproval response message showing travel non-permission.

After the travel permission section management unit 323 set the new travel permission section for each dump truck 20, it overwrites newly generated section information over the section information stored in the control device-side map information storage unit 314 to update the section information.

In the overtaking control processing that is a feature of the present invention, the travel permission section management unit 323 performs processing of correcting the number of the links and nodes included in a travel permission section being temporarily set. More specifically, in case where another vehicle (overtaking target vehicle) exists ahead of the traveling lane (for example, outward path) in which the own vehicle (overtaking vehicle) travels, the travel permission section management unit, in case where, when the overtaking path generation unit that will be described later generates an overtaking path, multiple links remain ahead of the other vehicle in the travel permission section of the other vehicle (corresponding to the second travel permission section), reduces the number of the remaining links and shortens the section length. In reducing the number of links, in case where there is the remaining section of the travel permission section of the other vehicle ahead of a safe point that is away from the current position of the other vehicle spaced by the front margin distance to be provided in order to avoid interference of the other vehicle and the own vehicle, the reduction of the number of links is performed by revoking the travel permission to the link within the remaining section so that a front end of the travel permission section may approach the safe point.

The travel permission section management unit 323 may decide the number of revocations of the travel permission to the link of the remaining section based on at least one of a vehicle length of the other vehicle, a vehicle length of the own vehicle, and the traveling speed of the own vehicle.

Then, upon receipt of a setting request of the travel permission section from the own vehicle, in case where setting of the travel permission section (corresponding to the first travel permission section) to the own vehicle only on the traveling lane causes the own vehicle to interfere with the other vehicle, the travel permission section management unit 323 sets a new travel permission section in the overtaking path.

The overtaking target vehicle detection unit 324 may detect whether the dump truck traveling ahead among multiple dump trucks 20-1, 20-2 traveling one after the other is the overtaking target vehicle that should be overtaken from a state of the travel permission section that the travel permission section management unit 323 manages, for example, an elapsed time after the travel permission section was set, or speed information of the dump truck 20 received through the server-side communication control unit, or the like. In this embodiment, based on a comparison result between a duration after the travel permission section was set and a time threshold value by which it is judged that a vehicle for which the travel permission section was set is stopped, it is determined whether the vehicle is a stopped vehicle, and if it is the stopped vehicle, the vehicle will be detected as the overtaking target vehicle.

The overtaking availability determination unit 325 determines whether the overtaking target vehicle that the overtaking target vehicle detection unit 324 detected can be overtaken at a point on the travel path referring to the map information of the control device-side map information storage unit 314. Incidentally, in this embodiment, the stopped vehicle is detected as the overtaking target vehicle as will be described later. Therefore, since the traveling own vehicle can certainly overtake the overtaking target vehicle (stopped vehicle), the overtaking availability determination unit 325 is not indispensable.

The overtaking path generation unit 326 generates the overtaking path in a vicinity of a point where the own vehicle performs overtaking on the other vehicle. The generated path is stored in the control device-side map information storage unit 314 by the overtaking path generation unit 326, and the dispatch management unit 322 resets the travel path including this overtaking path as a travel path for the dump truck 20 (one that performs overtaking among the dump trucks 20). Moreover, the travel permission section management unit sets the travel permission section including the section on the overtaking path stored in the control device-side map information storage unit 314 for the own vehicle.

More specifically, the overtaking path generation unit 326 generates the travel permission section so as to include a first transition section for the own vehicle to change lanes from the traveling lane of the own vehicle to the opposite lane, an overtaking section that connects to a node of a front end of the first transition path and is comprised of a link provided on the opposite lane, and a second transition section that connects to a node of a front end of the overtaking section and is for the own vehicle to return to the traveling lane from the overtaking section. At this time, the node of the front end of the first transition path is located at the same position or behind it as a node of a back end of the travel permission section of the other vehicle whose section length is shortened along the traveling direction with the position of the own vehicle as a reference. Moreover, the node of the front end of the overtaking section is located at the same position or ahead of it as the node of the front end of the travel permission section of the other vehicle along the traveling direction with the position of the own vehicle as a reference.

The overtaking path generation unit 326 may set curvatures of the first transition section and the second transition section so that lateral accelerations applied to the own vehicle traveling in the first transition section and the second transition section may become less than or equal to a reference lateral acceleration provided in order to suppress rolling of the own vehicle.

The display control unit 340 acquires the map information, positions of the dump trucks 20, and information of the travel permission sections being set for respective vehicles, and performs superimposing display of images showing the dump trucks 20 and the travel permission sections being set in a map image showing the travel path. Although in FIG. 4, the display control unit 340 is illustrated being connected to the control device-side communication control unit 310 and the I/F 315 for convenience of explanation, the display control unit 340 may be configured to acquire data that is to be illustrated from the management control unit 320 or a constitutional component included in this.

The control device-side communication control unit 310 and the management control unit 320 that are included in the management control device 31 are configured by software for realizing these functions being executed by the CPU 311 (hardware) shown in FIG. 3. Moreover, the control device-side map information storage unit 314 is configured with a storage device capable of storing information fixedly, for example, an HDD.

The travel control device 200 mounted on the dump truck 20 includes a vehicle-side communication control unit 250, a request information processing unit 260, an autonomous travel control unit 270, and a vehicle-side map information storage unit 204a, as shown in FIG. 5.

The vehicle-side communication control unit 250 controls the wireless communication performed between the management control device 31 and itself. The vehicle-side communication control unit 250 performs transmission of the section request message and reception of the section response message or the disapproval response message.

The request information processing unit 260 judges whether the dump truck 20 arrived at a point at which the request message is transmitted based on the map information stored in the vehicle-side map information storage unit 204a (same as the map information stored in the control device-side map information storage unit 314) and a current position computed by the position calculating device 220 (refer to FIG. 2), and when it arrived at the request point, the request information processing unit 260 generates the request message and transmits to the management control device 31 through the vehicle-side communication control unit 250.

The autonomous travel control unit 270 acquires the current position of the own vehicle from the position calculating device 220, refers to the map information on the vehicle-side map information storage unit 204a, and performs a control for making the own vehicle travel according to the travel permission section included in the section response message on the travel driving device 210 (refer to FIG. 2). Moreover, the autonomous travel control unit 270 determines presence of the obstacle ahead based on the detection result of the onboard sensor 230, also determines presence of interference with the obstacle and an avoidance operation of collision, and performs a control for braking operation if necessary. Furthermore, the autonomous travel control unit 270 performs driving control to the breaking device 211 according to the instruction from the management control device 31, and performs a deceleration operation, a usual stop operation, or an emergency stop operation.

The vehicle-side communication control unit 250, the request information processing unit 260, and the autonomous travel control unit 270 are configured by pieces of the software for realizing these functions being executed by the CPU 201 shown in FIG. 3. The map information stored in the vehicle-side map information storage unit 204a is configured as data stored on the HDD 204.

Figure 6A:
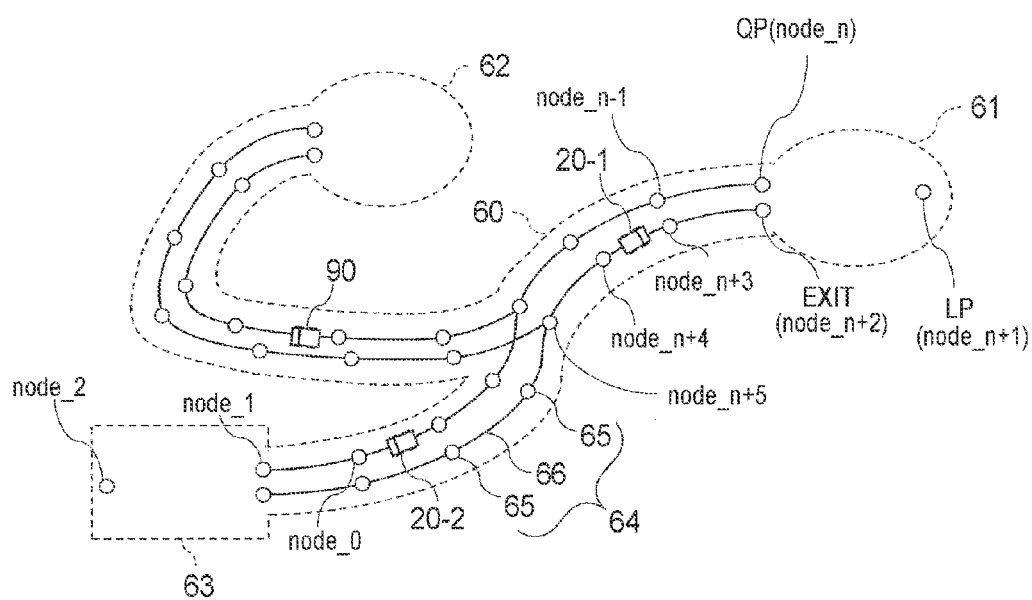
FIG. 6 is a diagram showing a configuration example of a surface mining field where dump trucks travel, in which (a) shows an entire travel path in the mine, (b) shows a travel path with one lane on each side, and (c) shows a travel path with two lanes for an outward path and one lane for a backward path.
Figure 6B:
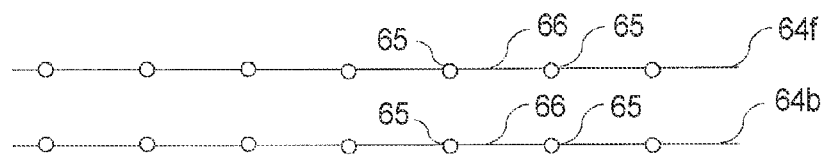
Figure 6C:
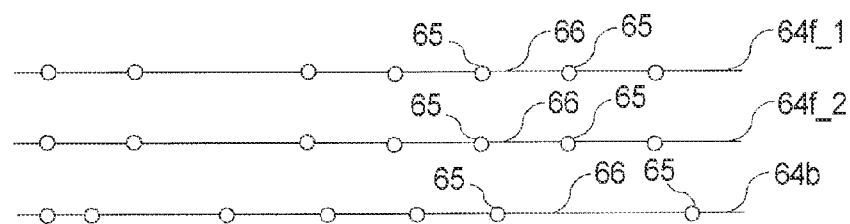
Figure 7A:
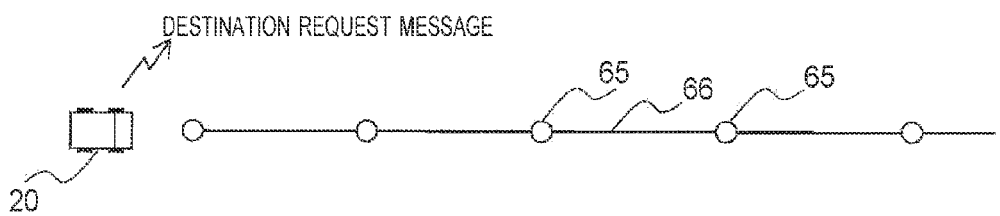
FIG. 7 is a diagram showing a communication operation between the dump truck and the control server at commencing the autonomous traveling, in which (a) shows a state of transmitting a request message of destination from the dump truck, (b) shows a response state from the control server, and (c) shows request and response states of a travel permission section.
Figure 7B:
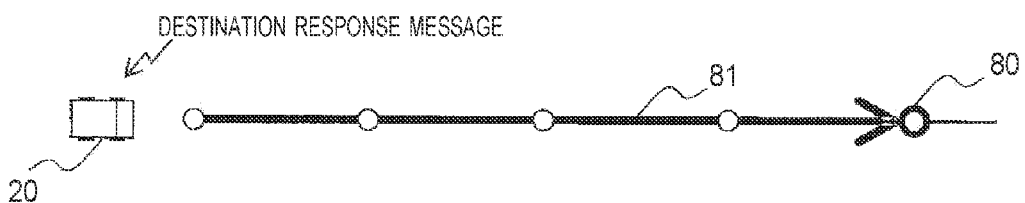
Figure 7C:
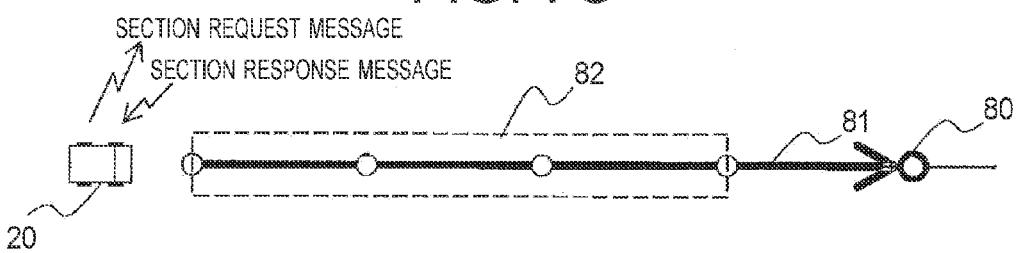
Figure 8A:
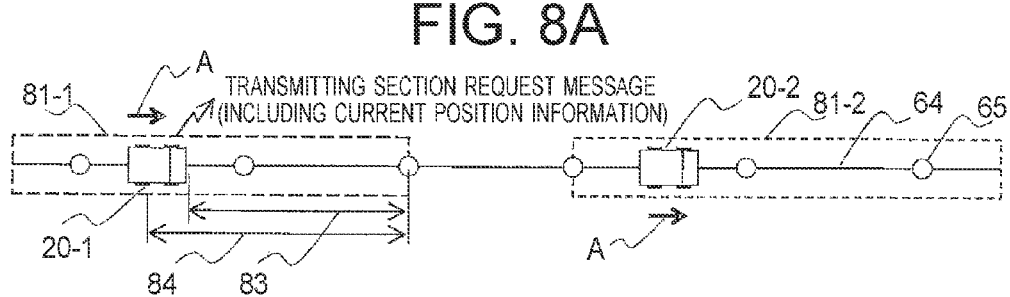
FIG. 8 is a diagram showing details of setting of the travel permission section, in which (a) shows a state of transmitting a request message of the travel permission section from the dump truck, (b) shows a response message from the control server, and (c) shows the request and response states of the travel permission section.
Figure 8B:
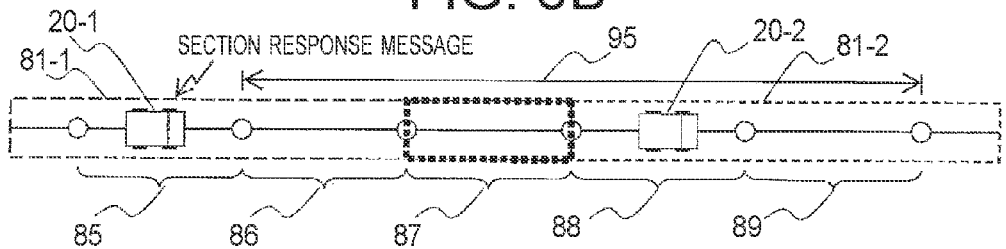
Figure 8C:
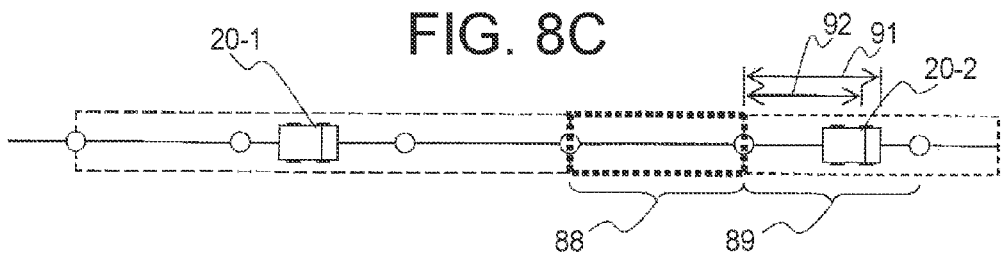

Next, processing between the dump truck and the control server at the time of the dump truck traveling is explained with reference to FIG. 6 to FIG. 8. FIG. 6 is a diagram showing a configuration example of a field of a surface mining where dump trucks travel, in which (a) shows the whole of the travel path in the mine, (b) shows the travel path with one lane on each side, and (c) shows the travel path with two lanes for the outward path and one lane for the backward path. FIG. 7 is a diagram showing a communication operation between the dump truck and the control server at commencing the autonomous traveling, in which (a) shows a state of transmitting a request message of destination from the dump truck, (b) shows a response state from the control server, and (c) shows request and response states of the travel permission section. FIG. 8 is a diagram showing details of the setting of the travel permission section, in which (a) shows a state of transmitting a request message of the travel permission section from the dump truck, (b) shows a response message from the control server, and (c) shows the request and response states of the travel permission section.

The symbol 61 shown in (a) of FIG. 6 indicates an excavation site done by mining machinery such as the shovel 10 and a loading site 61 where the mining machinery performs loading to the dump truck 20. A position at which the dump truck stops around the shovel 10 and performs the loading work in the loading site 61 is called the loading position (corresponding to LP of FIG. 6). Surface soil and ore that the shovel 10 excavated are loaded into the dump truck 20 in the loading site 61. A symbol 62 is a dumping site where the surface soil is developed, and in this place, the surface soil that was carried from the loading site 61 is dumped at this place, and is developed in a laminated state or radially. A symbol 63 is a dumping site in which a crusher for crushing the ore etc. are installed and crushed ore is conveyed by a belt conveyor etc. to a shipping site that uses a freight car or a processing facility or the like.

Moreover, QP is an entrance to the loading site 61, also showing a waiting position at which the dump truck 20 stops and waits until the shovel 10 permits the dump truck to enter (CALL) the loading position. EXIT of FIG. 6 is an exit through which the dump truck 20 leaves the loading site 61.

The dump truck 20 loads the surface soil and ore in the loading site 61, travels the travel path 60 to convey them to the dumping sites 62 and 63.

The travel path 60 may be configured to have one lane on each side as shown in (b) of FIG. 6 to include two lanes for an outward path 64f and a backward path 64b, or may be configured to have totally three lanes of two lanes 64f_1, 64f_2 for the outward path and the one lane 64b for the backward path, and the number of lanes is not limited. Incidentally, in a travel path having three or more lanes, the overtaking control processing explained in this embodiment relates to control processing where the own vehicle performs the overtaking by protruding itself from the traveling lane thereof to the opposite lane. i.e., a lane whose traveling direction is a reverse direction, not the overtaking between the lanes whose traveling directions are the same.

Moreover, as shown in (b) of FIG. 6, nodes 65 and links 66 that are set in the outward path and the backward path may be set to be in parallel with the outward path 64f and the backward path 64b running side by side, or as shown in (c) of FIG. 6, they may be set independently each other with a set of the nodes 65 and the links 66 of the outward paths $64f\_1$, $64f\_2$ and a set of the node 65 and the link 66 of the backward path 64b not running in parallel. Furthermore, the nodes 65 may be configured so as to set their intervals equal, as shown in (b) of FIG. 6, to effect the length of the link 66 having a fixed length, or may vary the intervals of the nodes 65, as shown in (c) of FIG. 6, to vary the length of the link 66.

The dump truck 20 travels along the travel permission section being set in the outward path 64f and the backward path 64b. The travel paths 64 are given as coordinate values being set on the map. The dump truck 20 performs autonomous traveling along the travel path 64 by controlling the acceleration and the steering while comparing an own position specified by GPS or another position computation device and coordinate values of the travel path 64. The travel permission section functions as a block section where only traveling of the own vehicle is permitted and entry of the other vehicle is blocked. Thereby, collision of the dump trucks is avoided.

In a state where the surface soil and ore have been loaded in the loading site 61, or in a state where they have been dumped at the dumping sites 62, 63, the dump truck 20 transmits a message (destination request message) requesting a destination to the management control device 31, as shown in (a) of FIG. 7. In case of the dump truck 20, this is done as follows: the request information processing unit 260 included in the travel control device 200 of the dump truck 20 judges a current self position and a situation of the vehicle (in stop), and makes sending through the vehicle-side communication control unit 250.

This destination request message is received by the control device-side communication control unit 310 on the management control device 31, and is transferred to the management control unit 320. The dispatch management unit 322 in the management control unit 320 decides the destination of the dump truck that has requested the destination 80 and the path 81 leading to it by referring to the map information of the control device-side map information storage unit 314 and considering situations of the other dump trucks 20, and instructs the control device-side communication control unit 310 to transfer a destination response message indicating the destination 80 and a path 81 leading to it to the dump truck. The control device-side communication control unit 310 sends the destination response message to the dump truck 20 through the wireless communication line 40 (refer to (b) of FIG. 7).

Then, the request information processing unit 260 on the dump truck 20 transmits the message (section request message) that requests the setting of the travel permission section to the management control device 31. The control device-side communication control unit 310 transfers the section request message to the management control unit 320. The travel permission section management unit 323 of the management control unit 320 sets a travel permission section 82 based on the processing explained below, and transmits the message (section response message) indicating the travel permission section being set to the dump truck 20 ((c) of FIG. 7). The section response message includes a node ID of the front boundary point of the travel permission section, a node ID of the back boundary point, and a link ID included in the travel permission section. The dump truck 20 can start a travel only after it obtains the travel permission section.

Next, details of the setting of the travel permission section are explained with reference to FIG. 8. In (a) of FIG. 8, the dump trucks 20-1, 20-2 are traveling vehicles, and symbols 81-1, 81-2 are the travel permission sections permitted to the respective vehicles. Each of the dump trucks 20-1, 20-2 is assumed to be traveling in a direction shown by an arrow-head A. A symbol 83 is a travel permission remaining distance indicating a distance from a current position of the dump truck 20-1 to the forefront end (terminal) of the travel permission section 81-1 along the travel path. A symbol 84 is a travel permission request starting distance indicating a distance from the forefront end (terminal) to a point at which the dump truck 20-1 starts transmission of the section request message.

The travel permission request starting distance 84 is a distance longer than the distance at which the dump truck can stop, for example, a stoppable distance added with a predetermined offset distance. The stoppable distance L of the dump truck can be obtained by, for example, the following formula where a mass of the vehicle including its loading is represented by m, a current speed of the vehicle by V, a braking force of the vehicle by f, and an offset coefficient specified corresponding to a safety factor by C.

[Formula 1]

$$L = c \frac{mv^2}{2f} \quad (1)$$

The offset coefficient C is a value equal to or more than 1 and is set in consideration of, for example, a time required by the wireless communication and a frequency of occurrence of a trouble in the wireless communication. The speed of the vehicle may be a current speed of the vehicle measured from the rotational speed of the wheel etc., or the speed limit (maximum allowable speed) that is specified by the map information to a current travel position of the vehicle.

As shown in (a) of FIG. 8, when the travel permission remaining distance 83 of the dump truck 20-1 becomes less than or equal to the travel permission request starting distance 84, the dump truck 20-1 transmits the section request message to the management control device 31. This section request message also includes information of the current position of the dump truck 20-1.

Upon receipt of the section request message from the dump truck 20-1, the management control device 31 specifies the travel section where the dump truck 20-1 exists using the sent information of the current position. Then, the management control device 31 gives the travel permission to a section that covers a shortest distance (travel permission given length) given as a predetermined travel permission section or more starting from the terminal of the section where the dump truck 20-1 exists. However, when there is a section where the permission is given to the other vehicle, the travel permission is given just up to the section.

In an example shown in (b) of FIG. 8, a section where the dump truck 20-1 exists is 85, and sections whose distances from its terminal is more than or equal to a travel permission section given length 95 are found to be 86, 87, 88, and 89. However, since the travel permission is already given to the dump truck 20-2 in the sections 88, 89, travel permissions of 86 and 87 will be given. Incidentally, since the travel permission is already given to the section 86, in this case, the section 87 will be given as a new travel permission section as a result.

The section to which the travel permission was given is canceled when a distance from the position of the vehicle to the terminal of the section becomes more than or equal to the travel permission canceling distance after the vehicle passed the section. In the example of (c) of FIG. 8, in the section 88 where the travel permission is given to the dump truck 20-1, the travel permission is canceled at a stage where a distance 91 from the vehicle 20-2 to a section terminal becomes more than or equal to a travel permission canceling distance 92, and the travel permission assignment to the dump truck 20-1 becomes possible.

Next, an outline of operation procedures of the autonomous travel system according to this embodiment is explained with reference to FIG. 9. FIG. 9 is a flowchart showing a flow of management control processing.

After main power is applied, the management control device 31 becomes in a waiting state of a message from the dump truck 20 while starting overtaking path generation processing (S900). Details of the overtaking path generation processing will be described later.

When the destination of the dump truck 20 is not set (S901/No), the request information processing unit 260 of the travel control device 200 transmits the destination request message (including current position information) to the management control device 31 through the wireless communication line 40 (S902). When the destination of the dump truck 20 is set (S901/Yes), the flow proceeds to Step S904.

The dispatch management unit 322 of the management control device 31 sets the destination referring to the current position information of the dump truck 20 and the map information of the control device-side map information storage unit 314, and transmits the destination response message indicating the result to the dump truck 20 (S903).

When the section request message needs to be transmitted, for example, when the travel permission section is not set for the dump truck 20, or when the travel permission remaining distance from the present travel permission section is less than or equal to the travel permission request starting distance (refer to (a) of FIG. 8, S904/Yes), the section request message is transmitted from the request information processing unit 260 (S905).

When the transmission of the section request message is unnecessary, that is, when the travel permission section is already set and the travel permission remaining distance is longer than travel permission request starting distance (S904/No), or when the section request message is received, the dump truck 20 autonomously travels (S906).

While the dump truck 20 continues travelling according to the travel permission section being given currently after transmitting the section request message, it waits for reception of the section response message from the management control device 31. The autonomous travel control unit 270 compares the current position from the position calculating device 220, the vehicle-side map information storage unit 204a, and the travel permission section being given currently, and when the travel permission remaining distance is less than or equal to the stoppable distance (S907/Yes), issues a braking instruction to the braking device 211 of the travel driving device 210 so that the vehicle may stop within the travel permission section, and then the dump truck 20 begins to decelerate (S908).

When the management control device 31 receives the section request message, the travel permission section management unit 323 sets the travel permission section based on the current position of the dump truck 20 and the map information stored in the control device-side map information storage unit 314, and the management control device 31 transmits the section response message indicating the content to the dump truck 20 (S909). The travel permission section management unit 323 sets a section that starts from a terminal of a section where the vehicle exists and measures the travel permission given length or more along the traveling direction of the vehicle as the travel permission section using a received current position of the vehicle and the section information of the control device-side map information storage unit 314 as long as the other vehicle is not given the permission or when there is a section where the other vehicle is given the permission, as far as just before the section. Furthermore, the travel permission section management unit 323 appends the information showing in which section the travel permission section was set, to the section information stored in the control device-side map information storage unit 314.

Upon receipt of the section response message (S910/Yes), the dump truck 20 starts to travel according to a new travel permission section indicated in the section response message, (S911). If the dump truck 20 does not receive the section response message, the flow will return to Step S905 (S910/No). The case where the section response message is not received includes, for example, a case where the section request message has not reached the management control device 31 by a communication error and a case where the section response message have not reached the dump truck 20.

When the distance from the current position of the dump truck 20 to the terminal of the section becomes more than or equal to the travel permission canceling distance (refer to (c) of FIG. 8, S912/Yes), the travel permission section management unit 323 cancels the setting of the travel permission section (S913). The travel permission section management unit 323 deletes the information indicating the travel permission section that is canceled from the section information. After this, the flow returns to Step S901. Moreover, when the distance from the current position of the dump truck 20 to the terminal of the section is less than the travel permission canceling distance (S912/No), the travel permission section management unit 323 does not cancel the travel permission until the distance becomes more than or equal to the travel permission canceling distance, and the dump truck continues to travel (S912).

Based on the above fundamental operation procedures, an operation when the dump truck performs the overtaking in this autonomous travel system is explained below. FIG. 10 is a flowchart showing details of overtaking path generation processing S900 of FIG. 9. As shown in FIG. 10, the overtaking path generation processing roughly includes overtaking vehicle detection processing (S1000), travel permission section correction processing of the overtaking target vehicle (S1100), and overtaking path generation processing (S1200). Hereinafter, it is explained along an order of steps of FIG. 10.

First, the overtaking target vehicle detection unit 324 refers to the travel permission section information included in the management information stored in the control information storage unit 315, and checks a duration of the travel permission section in each travel permission section unit (S1001). Here the "duration of the travel permission section" is a value that the travel permission section management unit 323 manages for every unit of the travel permission section, and is a time that elapses to the current time from a time at which one section on the map is set as the travel permission section for a certain vehicle, as a starting point. This time shall be reset when the section is canceled from the travel permission section, and elapsed time shall be counted from the beginning when the section is set as the travel permission section for another vehicle.

On the other hand, the control information storage unit 315 is holding an assumed duration of travel permission of each section as data. The assumed duration is an assumed value of time that the dump truck occupies the section as the travel permission section of the own vehicle when it travels each section at a specified speed, and is computed in consideration of the travel permission section given length 95 (refer to FIG. 8) from the length and the traveling speed being set for each section.

The overtaking target vehicle detection unit 324 compares an actual travel permission section duration checked in Step S1001 and the assumed duration described above in each section, and when a section whose actual duration is larger than the assumed duration is detected (S1002/Yes), detects a vehicle to which the detected travel permission section is assigned as the overtaking target vehicle (S1003). In detection processing of the overtaking target vehicle by comparison of the travel permission section duration and the assumed duration, the stopped vehicle is detected as the overtaking target vehicle. Therefore, in the following explanation, the overtaking target vehicle means the stopped vehicle.

Since when a section whose actual duration is larger than the assumed duration is not detected (S1003/No), it is not necessary to generate the overtaking path because of non-existence of the overtaking target vehicle, the flow proceeds to Step S901.

Thus, if the overtaking target vehicle is detected based on the duration of the travel permission section, it is possible to detect existence of the overtaking target vehicle by information that only the management control device 31 holds even when the communication with the vehicle in the mine is disrupted.

When the overtaking target vehicle is detected (S1003), the travel permission section management unit 323 performs the travel permission section correction processing of the overtaking target vehicle (S1100). When the travel permission section being set for the overtaking target vehicle is long, the vehicle that overtakes the vehicle must travel the opposite lane for a long distance. A vehicle in the opposite lane may be blocked by this and conveyance efficiency may fall. In order to minimize this influence, if the travel permission section of the overtaking target vehicle can be reset to be short, a time in which the opposite lane is blocked is shortened by shortening the travel permission section and by generating the overtaking path also to be short.

Then, the management control unit 320 requires each overtaking target vehicle to transmit its position and acquires this information, whereby the management control device 320 acquires the position information of the overtaking target vehicle (S1101).

Since when the position information cannot be acquired (S1101/No), there is a possibility that the overtaking target vehicle and the overtaking vehicle may interfere with each other upon shortening of the travel permission section, the flow proceeds to overtaking path generation processing (S1300) without making correction to the travel permission section length.

When the position information was able to be acquired (S1101/Yes), it is checked whether the travel permission section of the overtaking target vehicle is set to a minimum value (S1102). How to give the minimum value of the travel permission section will be described later.

When the travel permission section of the overtaking target vehicle is set to the minimum value (S1102/Yes), the flow proceeds to the overtaking path generation processing (S1200).

When the travel permission section of the overtaking target vehicle is not set to the minimum value (S1102/No), the management control unit 320 sets so that the length of the travel permission section of the overtaking target vehicle may be minimized, and transmits a range of a new travel permission section to the overtaking target vehicle (S1103).

Figure 11A:
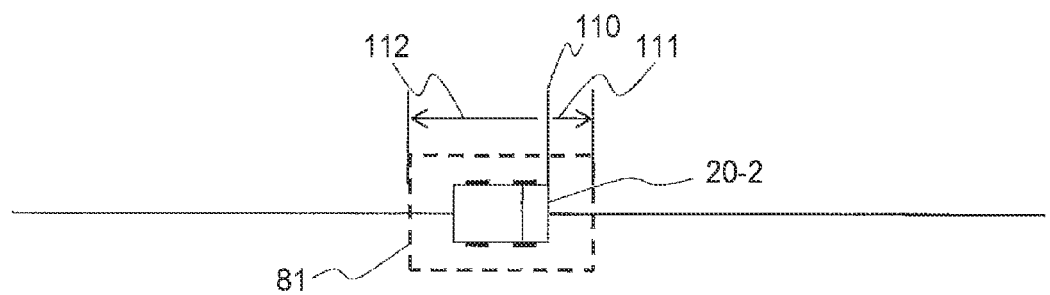
FIG. 11 is a diagram showing how to give a minimum value of the travel permission section, in which (a) shows the minimum value when a length of a link is not considered, (b) shows one example where margins are provided in its front and rear, and (c) shows another example where the margins are provided in the front and rear.
Figure 11B:
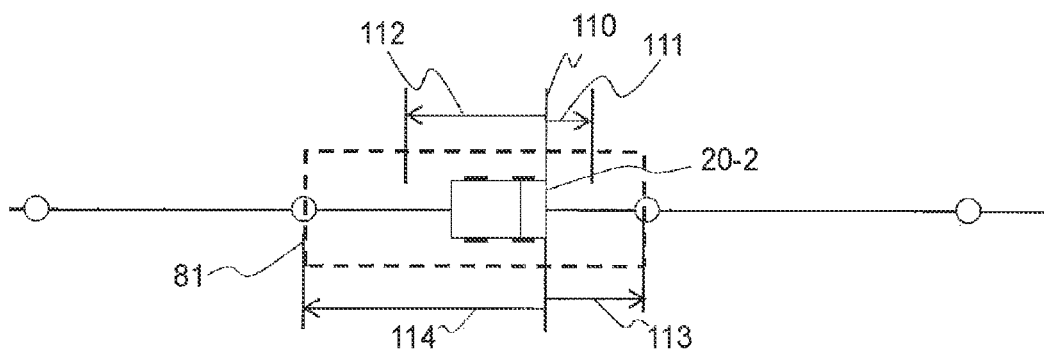
Figure 11C:
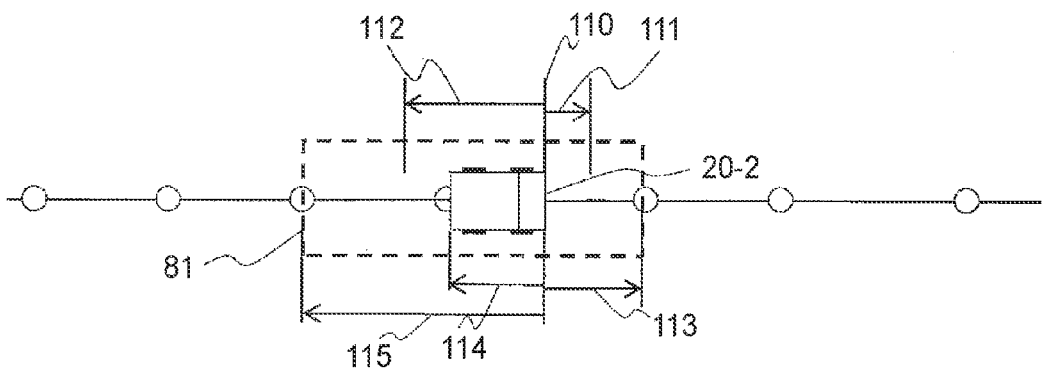

Here, with reference to FIG. 11, how to give the minimum value of the travel permission section is explained. FIG. 11 is a diagram showing how to give the minimum value of the travel permission section, in which (a) shows the minimum value of the travel permission section when the length of the link is not considered, (b) shows one example where margins are provided in its front and rear, and (c) shows another example where the margins are provided in the front and rear.

As shown in (a) of FIG. 11, when not considering the length of the link, distances by which the dump truck 20 does not approach the other vehicle from a current position 110 of the dump truck 20 (in this example, a front top of the dump truck is designated as the current position of the vehicle) are considered in its front and rear, and these are designated as a front margin distance 111 and a rear margin distance 112, respectively. When not considering the link, if an interval between the end of the front margin 111 and the end of the rear margin distance 112 is designated as the travel permission section 81 for the dump truck 20, safety can be secured as long as the dump truck 20 is stopped.

Based on this, (b) of FIG. 11 is a diagram of the case where the current position of the dump truck 20 is located in such a position that both the front margin distance 111 and the rear margin distance 112 fall within a range of two adjacent nodes. That is, this is a case where a distance 113 from the current position 110 of the dump truck 20 to a nearest node ahead of it is longer than the front margin distance 111, and a distance 114 from the current position 110 of the dump truck 20 to a nearest node behind it is longer than the rear margin distance 112 similarly. Since the travel permission section is given in a link unit, when each margin does not exceed the node in this way, it gives the minimum value by setting the link between the nearest nodes in the front and rear of the dump truck as the travel permission section 81.

Incidentally, when minimizing the travel permission section 81, the travel permission section management unit 323 shortens the travel permission section length by reducing the number of nodes and the numbers of links included in a non-traveled section of the travel permission section (remaining section) located ahead of the overtaking target vehicle, not by changing the node positions and the link length being set by the map information. In this case, since the link length is optimized in advance by the map information, when the number of links is reduced, the travel permission section length is also optimized. As a result of being minimized, a link that is reduced from the remaining section serves as a section for which the travel permission can be given for the other dump trucks.

Next, (c) of FIG. 11 is a diagram in case where the rear margin goes beyond the node while the front margin does not go beyond the node. That is, it is a case where the distance 114 to a nearest node behind it is shorter than the rear margin distance 112. At this time, if only the link where the dump truck 20 is located is specified as the travel permission section, there will be a possibility that the travel permission section of the other vehicle may be set within the rear margin; therefore, it is necessary to set the link to a node further behind as the travel permission section. In this figure, since a distance 115 from the current position to a nearestbut-one node behind it becomes longer than the rear margin distance 112, setting a link up to this node as the travel permission section gives the minimum value.

Figure 12A:
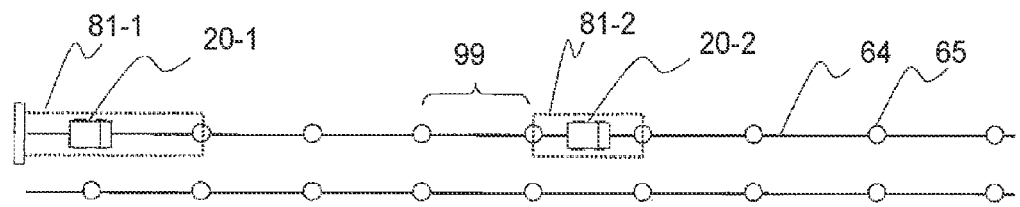
FIG. 12 is a diagram showing an outline of overtaking path generation, in which (a) shows a state where there is another vehicle that becomes an overtaking target vehicle ahead of the own vehicle, (b) shows one example of the overtaking path, and (c) shows another example of the overtaking path.
Figure 12B:
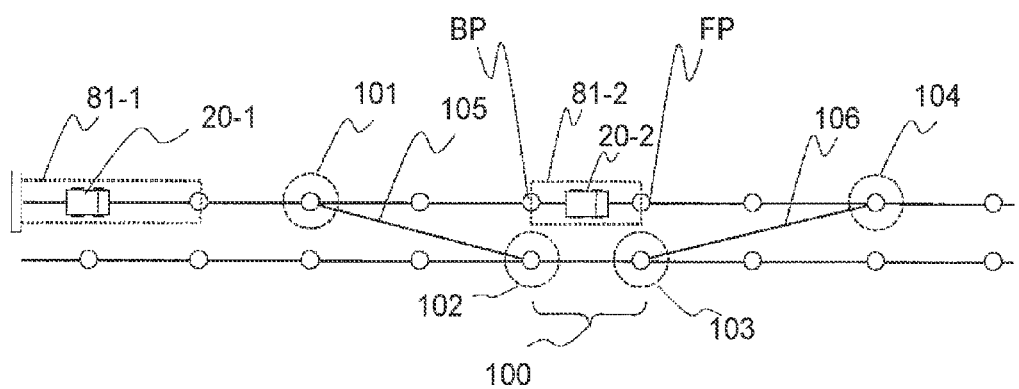
Figure 12C:
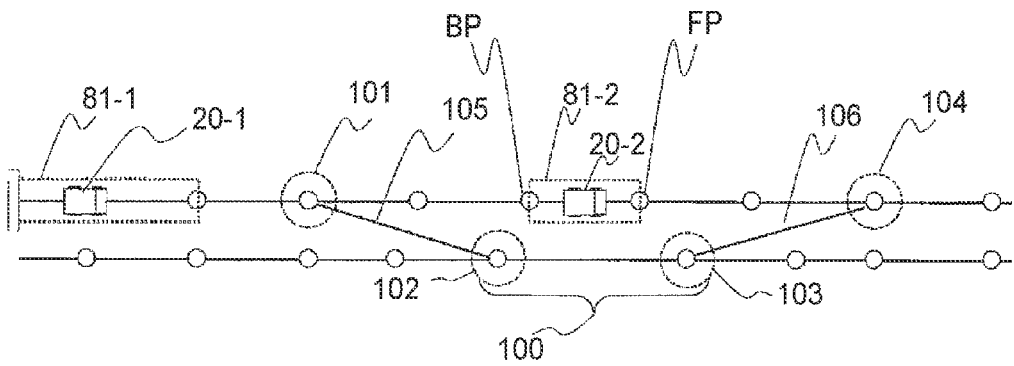

Next, the overtaking path generation processing shown in Step S1200 of FIG. 10 is explained with reference to FIG. 12. FIG. 12 is a diagram showing an outline of overtaking path generation, in which (a) shows a state where there is another vehicle 20-2 to be overtaken ahead of the own vehicle 20-1, (b) shows one example of the overtaking path, and (c) shows another example of the overtaking path.

In (a) of FIG. 12, the symbols 81-1, 81-2 are the travel permission sections being set for the dump trucks 20-1, 20-2, respectively.

In such a scene, only by usual control of the travel permission section, when the dump truck 20-1 arrives at a section 99 just behind the dump truck 20-2, the dump truck 20-1 decelerates and stops in the section 99 because the travel permission of a section ahead of it was not given from the management control device 31, and is unable to restart to travel until the dump truck 20-2 starts to travel. In order to avoid this problem, the overtaking path generation unit 326 of the management control device 31 generates the overtaking path using the opposite lane so that the dump truck 20-1 can continue traveling by overtaking the stopped dump truck 20-2.

As shown in (b) and (c) of FIG. 12, the overtaking path is generated using the opposite lane. The overtaking path is comprised of three portions: a first transition path 105 for the own vehicle to change lanes from the own lane to the opposite lane; an overtaking section 100 that connects to the front end of the first transition path 105 and is provided on the opposite lane, i.e., the section 100 on the opposite lane; and a second transition path 106 for the own vehicle to change lanes from the opposite lane to the own lane, returning (coming back) to it.

The first transition path 105 and the second transition path 106 are paths provisionally generated by the overtaking path generation unit 326. In doing this, by a method that will be described later, first, a starting point 101 of the first transition path 105, an end point 102, a starting point 103 of the second transition path 106, and an end point 104 are selected as starting points and end points for generating the first transition path 105 and the second transition path 106 with the travel permission section 81-2 being set for the other vehicle 20-2 as a reference, and the first transition path 105 and the second transition path 106 are generated by referring to the map information of the control device-side map information storage unit 314 and based on information of those points.

The starting point 101 of the first transition path 105 is set using a node that is behind the travel permission section 81-2 being set for the other vehicle 20-2 and is ahead of the own vehicle 20-1 among the nodes lying on a traveling lane of the own vehicle 20-1. The end point 102 of the first transition path 105 is set using the same position (refer to (b) of FIG. 12) as the back boundary point BP of the travel permission section 81-2 or a node (refer to (c) of FIG. 12) behind the back boundary point BP among the nodes on the opposite lane.

The starting point 103 of the second transition path 106 is set using the same position as the front boundary point FP of the travel permission section 81-2 (refer to (b) of FIG. 12) or a node ahead of the front boundary point FP (refer to (c) of FIG. 12) among the nodes on the opposite lane. The end point 104 of the second transition path 106 is set using a node on the traveling lane ahead of the travel permission section 81-2.

Returning to FIG. 10, the overtaking path generation processing S1200 is explained. The overtaking path generation unit 326 decides which section on the opposite lane is set as the overtaking path for the other vehicle 20-2 detected by the overtaking target vehicle detection unit 324 based on the travel permission section 81-2 being set (S1201). At this time, a section on the opposite lane running parallel to the travel permission section of the overtaking target vehicle is decided so that the overtaking vehicle can travel. A concrete method of obtaining such a section is as follows. For example, a tangent of the travel path is obtained using front and back node information etc. in each endpoint node of the travel permission section of the overtaking target vehicle, and a perpendicular line to the each tangent is drawn from the endpoint node as a starting point toward the opposite lane. At this time, an area inside intersections of perpendicular lines going down to the opposite lane from the two endpoint nodes and the opposite lane becomes an area on the opposite lane running parallel to the travel permission section of the overtaking target vehicle. A section on the opposite lane including this area is decided as the overtaking section 100 on the opposite lane.

Next, the endpoint node of the overtaking section 100 on the opposite lane decided at Step S1201 that is behind in the traveling direction on the opposite lane is selected as the end point 102 of the first transition path 105, and an endpoint node in the opposite lane of the same section that is ahead in the traveling direction is selected as the starting point 103 of the second transition path 106 (S1202).

Then, the overtaking path generation unit 326 selects provisionally the starting point 101 of the first transition path 105 from the nodes on the own line with the end point 102 of the first transition path 105 obtained at the previous step as a reference, and similarly selects provisionally the end point 104 of the second transition path 106 from the nodes on the own lane with the starting point 103 of the second transition path 106 as a reference (S1203). The selection method may be as follows: the starting point 101 of the first transition path 105 is selected to be behind the travel permission section 81-2 of the overtaking target vehicle in the traveling direction on the own lane and the end point 103 of the second transition path 106 is selected to be ahead of the travel permission section 81-2 in the traveling direction on the own lane, sequentially.

Next, the first transition path 105 and the second transition path 106 are generated with the nodes selected at the steps S1202, S1203 described above as references (S1204). As a generation method, the starting point and end point may be connected with a straight line, or a path may be generated using multiple clothoid curves so that a steering amount may vary continuously. Moreover, at this time, the traveling speed of the dump truck in each transition path is also decided. As a method for deciding the speed, it may be computed, for example, as an average value of the links in the front and rear of each transition path.

After generating the first transition path 105 and the second transition path 106, the overtaking path generation unit 326 determines whether a curvature of the transition path is not more than a permissible value to the traveling speed (S1205). When the dump truck travels while steering being performed, centripetal acceleration (lateral G) is applied, and when it is large, there is a possibility that the dump truck may turn over. Therefore, a restriction is provided to a centripetal acceleration that is allowable to the traveling speed of the dump truck, namely, to a relation of curvature and speed. Based on this restriction, determination by the traveling speed and the curvature of the generated transition path is performed. When the transition path is generated with a straight line, the curvature may be computed from an angle that the own lane and the transition path makes and an angle that the opposite lane and the transition path makes, and when the transition path is generated with a clothoid curve, a value coming from a process of the computation may be used. This determination is performed for each of the first transition path 105 and the second transition path 106; if the curvature is less than or equal to the allowable value, the processing will be ended (S1205/Yes), and if there is one that is larger than the allowable value, the flow will return to S1203 regarding it and the node on the own lane will be selected again (S1205/No).

By the above procedures, the overtaking path generation unit 326 generates the first transition path 105 and the second transition path 106. The section 100 that is selected as a section where the vehicle travels in the opposite lane and these first transition path 105 and second transition path 106 serve as the overtaking path in which the own vehicle 20-1 travels.

Figure 13A:
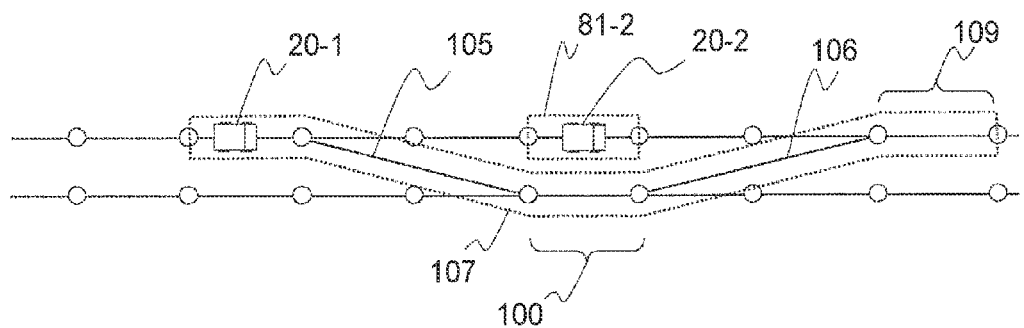
FIG. 13 is a diagram showing an outline of a method for setting the travel permission section to the overtaking path, in which (a) shows the overtaking path and (b) shows the travel permission section being set for it.
Figure 13B:
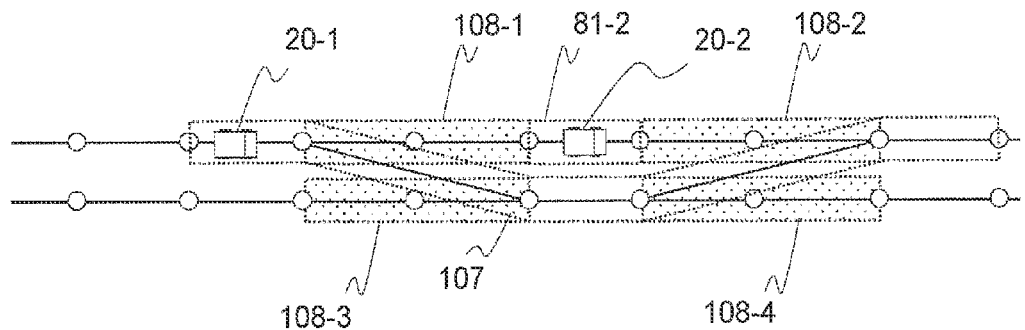
Figure 14:
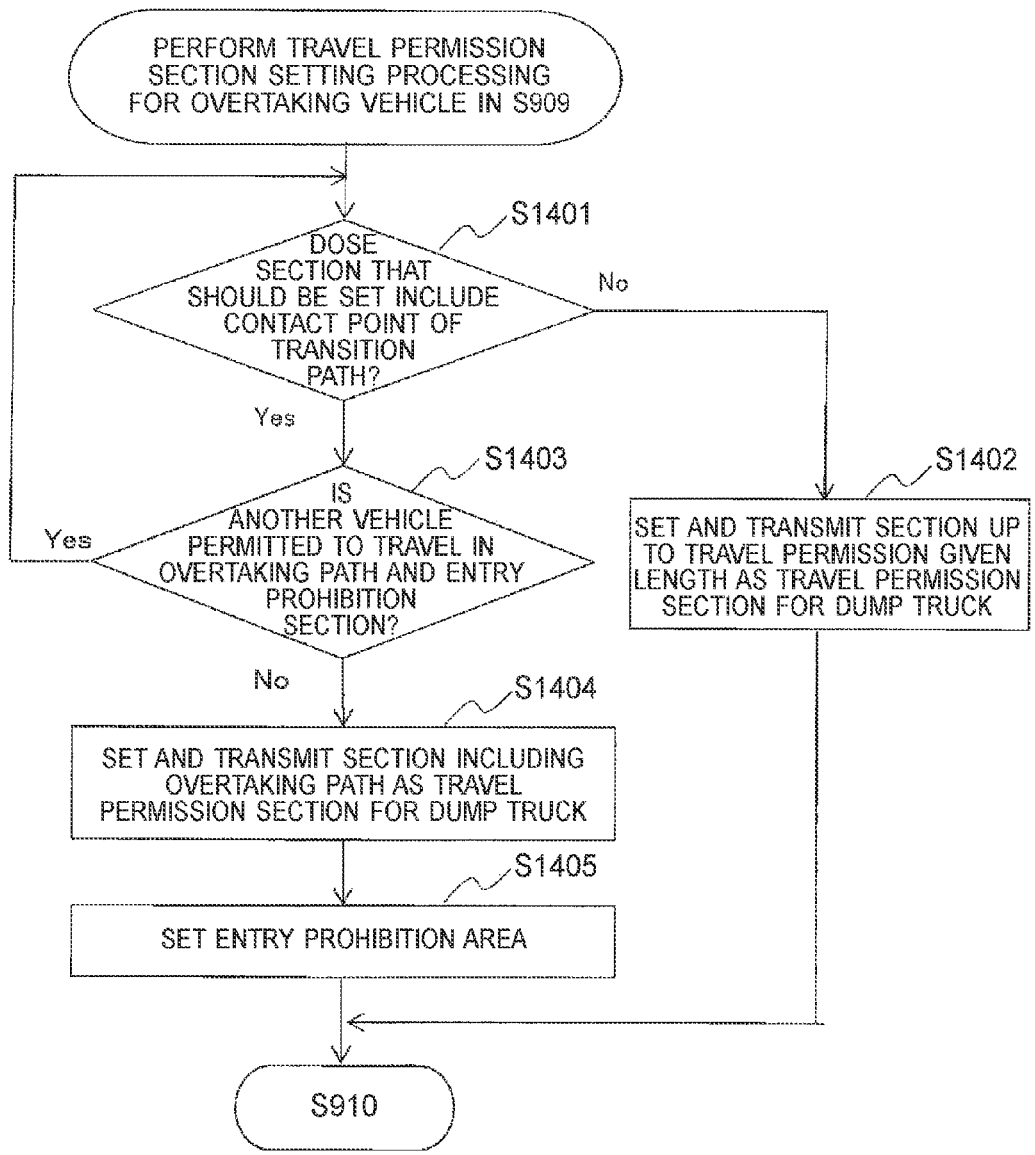
FIG. 14 is a flowchart of the setting of the travel permission section for an overtaking vehicle.

Next, with reference to FIG. 13 and FIG. 14, how to set the travel permission section to the generated overtaking path is explained. FIG. 13 is a diagram showing an outline of the travel permission section setting method for the overtaking path, in which (a) shows the overtaking path and (b) shows the travel permission section being set for it. FIG. 14 is a flowchart of the travel permission section setting for the overtaking vehicle.

First, an outline of the travel permission setting section method for the overtaking path is explained using FIG. 13. When making the own vehicle 20-1 perform the overtaking, as shown in (a) of FIG. 13, a travel permission section 107 is set on the overtaking path. That is, an area where the own vehicle on the traveling lane exists, the first transition path 105 by which the lane is transited to the opposite lane, the overtaking section 100 on the opposite lane, the second transition path 106 by which the lane returns to the own lane, and a section 109 on the own lane into which the own vehicle enters after the overtaking are designated as the travel permission section 107.

Sections 108-1, 108-2, 108-3, and 108-4 (hereinafter called as a section 108 collectively when there is no necessity of distinguishing them) shown by (b) of FIG. 13 are each a section that is set as a section decided to be entry prohibition to the other vehicles in order to prevent collision of the own vehicle 20-1 and the other dump trucks when the travel permission section 107 is set for the own vehicle. The method for setting the section 108 is to select a section having a possibility of occurrence of collision with the overtaking vehicle when the other vehicle enters. For example, in the first transition path 105 and the second transition path 106, if an overlapping area is generated between a plane obtained by developing a distance in a vehicle width direction with a safety margin involved in a vertical direction along each transition path and a plane obtained similarly by developing a distance in the vehicle width direction with a safety margin involved in a vertical direction along a section of each link on the own lane and opposite lane, such an area on the traveling lane (own lane) and the opposite lane is a section where there is a possibility that collision may occur in case where the other vehicle enters while the own vehicle 20-1 performs the overtaking; therefore, it is selected as the entry prohibition section.

Moreover, although the sections 108-1, 108-3 are also selected as the entry prohibition sections in (b) of FIG. 13, these sections are sections into which the other vehicle do not enter unless the other vehicle 20-2 and the vehicle in the opposite lane travel in a direction opposite to the traveling direction of the travel path; therefore, it is not necessarily required to select them as the entry prohibition sections.

The entry prohibition section 108 is managed by the travel permission section management unit 323. The travel permission section management unit 323 may manage the section as the entry prohibition section in terms of data, or although it sets the section as the travel permission section for the own vehicle 20-1, it may manages the section so that no section information may be transmitted to the own vehicle 20-1 actually. Thus, it is prevented to permit the other vehicle to travel.

Moreover, when permitting the own vehicle 20-1 to travel the overtaking path, the travel permission section 107 and the entry prohibition section 108 that were explained above are all set simultaneously. This is because with the method of setting the sections up to the middle sequentially, when an oncoming vehicle is traveling in the opposite lane during implementation of the overtaking, the vehicles stop face to face mutually by the control based on the travel permission section, but neither of them can proceed forward further, reaching a deadlock state; therefore, this scheme is to prevent this situation.

Based on the above, an operation of travel permission of the overtaking path in the travel permission section management unit 323 of the management control device 31 is explained with reference to FIG. 14. It is assumed that when starting setting processing of the travel permission section of FIG. 14, the own vehicle 20-1 (refer to FIG. 13) transmits the section request message in Step S905 of FIG. 10, and the management control device 31 receives it.

In response to the section request message, the travel permission section management unit 323 checks a section that should be set for the dump truck (the own vehicle 20-1) based on the travel permission given length, and determines whether a node serving as a contact point of the first transition path 105 leading to the opposite lane is included in it (S1401).

In case where no contact point of the transition path is included (S1401/No), in accordance with the method for setting a usual travel permission section, the travel permission section management unit 323 sets a section up to the travel permission given length as the travel permission section and transmits it to the dump truck (S1402).

In case where the contact point of the transition path is included (S1401/Yes), the travel permission section management unit 323 determines whether the overtaking path and the entry prohibition section are permitted for the other vehicle to travel (S1403). Since when the other vehicle is permitted to travel (S1403/Yes), the dump truck cannot be permitted to travel the overtaking path, the flow returns to S1401. When the travel permission is not given to any of the other vehicles, the travel permission section management unit 323 sets the overtaking path as the travel permission section for the dump truck, and transmits it (S1404). Furthermore, it sets an entry prohibition area (S1405).

Moreover, although not being illustrated in the flowchart of FIG. 14, the travel permission section management unit 323 may adjust a timing at which it permits the overtaking vehicle to travel in the overtaking path so that the permission is given immediately after the oncoming vehicle traveling in the opposite lane passed through the overtaking path and the entry prohibition section. This may include processing whereby the overtaking path is not permitted for the overtaking vehicle until the oncoming vehicle has passed the overtaking path and the entry prohibition section in case where even when the overtaking path and the entry prohibition section are not permitted for the other vehicle to travel in Step S1403, if the overtaking vehicle is permitted to travel immediately, occurrence of standby of the oncoming vehicle traveling in the opposite lane is predicted, and other processing. By this, an influence on traveling of the oncoming vehicle caused by the overtaking can be made small.

The above is a flow of operations by which the travel permission section management unit 323 permits the traveling in the overtaking path. Although not being illustrated in this embodiment, after the overtaking vehicle (own vehicle) completed the overtaking and returned to the traveling lane, when the overtaking vehicle has passed a terminal of the overtaking path (terminal of the section 109 in FIG. 13) and has left it by the travel permission section canceling distance or more, the overtaking path is canceled according to a normal travel permission section cancellation method. In doing the cancellation, the travel permission of the overtaking path and setting of the entry prohibition section are canceled.

Moreover, even when the travel permission section of the overtaking path is canceled, the overtaking path itself is not deleted; therefore, when another vehicle performs the overtaking consecutively, the similar travel permission/cancellation is performed again.

However, in case where the overtaking becomes impossible on an already-generated overtaking path because the overtaking target vehicle restarted traveling and its position was moved, it is necessary to delete the overtaking path. Then, an operation of, when the overtaking target vehicle restarts to travel, setting a new travel permission section after deleting the overtaking path is explained with reference to FIG. 15. FIG. 15 is a flowchart showing a flow of processing of a new travel permission section accompanied by deletion of the overtaking path.

It is assumed that in starting the processing of FIG. 15, the management control device 31 has received the section request message from the overtaking target vehicle in Step S904 of FIG. 9.

In response to the section request message, the travel permission section management unit 323 determines whether the section that should be set for the overtaking target vehicle includes the entry prohibition section associated with the overtaking path based on the travel permission given length (S1501). When the entry prohibition section is not included (S1501/No), in accordance with the method for setting a usual travel permission section, the travel permission section is set to the vehicle (S1503).

When the entry prohibition section is included (S1501/Yes), while deleting the first transition path 105 and the second transition path 106 that are related to the overtaking path related to it, the vehicle is ousted from setting of the overtaking target vehicle (S1502). After this, the travel permission section that should be set is set to the vehicle (S1503).

Since according to this embodiment, if there are the setting request of the travel permission section and wireless communication at the time of response, the overtaking will become possible without communicating the positions of the own vehicle and the other vehicle frequently during the overtaking, it is possible to suppress increase of the wireless communication amount at the time of non-overtaking. Moreover, when generating the overtaking path, the own vehicle can return to the traveling lane sooner by shortening the travel permission section that is set for the other vehicle becoming an overtaking target, and it is possible to make the own vehicle perform the overtaking while making down an influence affecting a traveling time interval of a vehicle traveling in the opposite lane.

Since at this time, the link length is set according to the vehicle length or the speed limit, if the number of links is reduced, the travel permission section length can also be shortened to a suitable length. Moreover, when reducing the link length, interference caused by reducing the travel permission section length can be avoided by securing a safety margin distance between the other vehicle and the own vehicle.

Moreover, the curvatures of the first transition section and the second transition section included in the overtaking path can serve to avoid a roll accident that arises from excess steering amount at the time of the overtaking by reducing the lateral acceleration applied to the traveling own vehicle to less than or equal to the reference lateral acceleration provided in order to suppress the rolling.

Moreover, by detecting the stopped vehicle based on setting time of the travel permission section, the stopped vehicle can be detected utilizing the travel permission section information required for block control. As a result, detection of the stopped vehicle can be done even when the wireless communication from the stopped vehicle is ceased.

The above-mentioned embodiments are illustrations for explaining the present invention, and do not have a purpose of limiting a scope of the present invention to the above-mentioned embodiments. A person skilled in the art can carry out the present invention in other various modes within a range that does not deviate from the gist of the present invention.

For example, although in this embodiment, the overtaking target vehicle detection unit 324 detects the overtaking vehicle based on the duration of the travel permission section, detection processing of the overtaking vehicle is not limited to what was mentioned above, for example, the user may input an operation that specifies the overtaking target vehicle from an input device of the management control device 31.

Moreover, although in FIG. 9, for convenience of explanation, the management control processing of the autonomous traveling dump truck at S901 and below was described explained after the overtaking path generation processing (S900), the overtaking path generation processing (S900) and the management control processing of the autonomous traveling dump truck may be executed by parallel processing when the main power of the management control device 31 is turned on.

LIST OF REFERENCE SIGNS

1: Autonomous travel system
20, 20-1, 20-2: Autonomous traveling dump truck
31: Control device (Management control device)

The invention claimed is:
1. A management control device for performing a management control that makes a plurality of vehicles travel in a travel path where a traveling lane and an opposite lane are positioned side by side and makes an own vehicle that is one vehicle among the vehicles overtake another vehicle stopped ahead in the traveling lane of the own vehicle via the opposite lane, the management control device comprising:
a map information storage unit for storing traveling lane map information that defines a map of the traveling lane using a plurality of nodes positioned on the traveling lane and links connecting adjacent nodes and opposite lane map information that defines a map of the opposite lane using a plurality of nodes positioned on the opposite lane and links connecting adjacent nodes;

a travel permission section management unit that sets a partial section including at least one link as a first travel permission section where only the own vehicle is permitted to travel ahead of the own vehicle in the traveling lane for the own vehicle, and sets a partial section including at least one link as a second travel permission section where only the other vehicle is permitted to travel ahead of the other vehicle in the traveling lane for the other vehicle;

an overtaking path generation unit for generating an overtaking path that includes a first transition section for the own vehicle to change lanes from the traveling lane to the opposite lane at the overtaking, an overtaking section that connects to a node of a front end of the first transition path and is comprised of at least one link provided on the opposite lane, and a second transition section that connects to a node of a front end of the overtaking section and is for the own vehicle to return to the traveling lane from the overtaking section; and a communication control unit that performs the wireless communication for receiving setting request information of the first travel permission section from the own vehicle and transmitting response information indicating the first travel permission section being set, wherein in case where, when the overtaking path generation unit generates the overtaking path, the second travel permission section remains ahead of the other vehicle in the second travel permission section, the travel permission section management unit shortens a section length of the remaining section, the overtaking path generation unit is such that the node of the front end of the first transition path is located at the same position or behind it as a node of a back end of the second travel permission section whose section length is shortened along a traveling direction with the position of the own vehicle as a reference, and a node of a front end of the overtaking section is located at the same position or ahead of it as a node of a front end of the second travel permission section whose section length is shortened along the traveling direction with the position of the own vehicle as a reference, and the travel permission section management unit sets the first travel permission section on the overtaking path in case where, when the setting request information is received, setting of the travel permission section only on the traveling lane causes the own vehicle to interfere with the other vehicle.

2. The management control device according to claim 1, wherein the link is configured to have a unit length that is fixed according to at least one of a vehicle length of the own vehicle or the other vehicle and a speed limit being set to the link, and in case where, when the overtaking path generation unit generates the overtaking path, a plurality of links remain ahead of the other vehicle in the second travel permission section, the travel permission section management unit shortens a section length of the second travel permission section by reducing the number of links through revoking the travel permission to a link within the remaining section.

3. The management control device according to claim 1, wherein in case where, when shortening a section length of a remaining section of the second travel permission section, the remaining section of the second travel permission section exists ahead of a safe point that is away from the current position of the other vehicle by the front margin distance to be provided in order to avoid interference between the other vehicle and the own vehicle, the travel permission section management unit revokes the travel permission to the link within the remaining section so that a front end of the second travel permission section may approach the safe point.

4. The management control device according to claim 3, wherein the travel permission section management unit decides the number of revocations of the travel permission to the link of the remaining section based on at least one of a vehicle length of the other vehicle, a vehicle length of the own vehicle, and a traveling speed of the own vehicle.

5. The management control device according to claim 1, wherein the overtaking path generation unit sets curvatures of the first transition section and the second transition section so that lateral accelerations applied to the own vehicle traveling in the first transition section and the second transition section may become less than or equal to a reference lateral acceleration provided in order to suppress rolling of the own vehicle.

6. The management control device according to claim 1, further comprising an overtaking target vehicle detection unit that determines whether the other vehicle is a stopped vehicle based on a comparison result between a duration after the second travel permission section is set and a time threshold value for judging that the other vehicle is stopped, and detects the other vehicle as an overtaking target vehicle to the own vehicle.

* * * * *